`US011144254B2`

(12) United States Patent
Ohnishi

(10) Patent No.: US 11,144,254 B2
(45) Date of Patent: Oct. 12, 2021

(54) INFORMATION PROCESSING APPARATUS

(71) Applicant: SHARP KABUSHIKI KAISHA, Sakai (JP)

(72) Inventor: Kazuyuki Ohnishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/921,754

(22) Filed: Jul. 6, 2020

(65) Prior Publication Data
US 2021/0019094 A1 Jan. 21, 2021

(30) Foreign Application Priority Data

Jul. 19, 2019 (JP) .............................. JP2019-133956

(51) Int. Cl.
*G06F 3/12* (2006.01)
(52) U.S. Cl.
CPC .......... *G06F 3/1204* (2013.01); *G06F 3/1257* (2013.01); *G06F 3/1258* (2013.01)
(58) Field of Classification Search
CPC .... G06F 3/1204; G06F 3/1258; G06F 3/1257; H04N 1/32085; H04N 1/00501
USPC ....................................................... 358/1.15
See application file for complete search history.

(56) References Cited

U.S. PATENT DOCUMENTS

| 6,275,218 B1 * | 8/2001 | Matsuda ............... G06F 3/0482 345/168 |
| 9,036,167 B2 * | 5/2015 | Ogino ................ H04N 1/00411 358/1.13 |

FOREIGN PATENT DOCUMENTS

| JP | H06-175444 A | 6/1994 |
| JP | 2006-184703 A | 7/2006 |

* cited by examiner

*Primary Examiner* — Neil R McLean
(74) *Attorney, Agent, or Firm* — ScienBiziP, P.C.

(57) ABSTRACT

Provided is an information processing apparatus including an operation device, a key activation setter that sets whether to enable or disable a predetermined input operation, a function executer that executes a function selected by the operation device, and a storage that stores immediately preceding setting information containing setting values of setting items of a function executed immediately before. The operation device includes re-operation instruction keys that instruct an operation for the function executed immediately before. After the function selected is executed, setting values of setting items used during the execution are stored as the immediately preceding setting information, and the key activation setter enables an input operation with a re-operation instruction key for a fixed time period. If, within a time period during which the input operation with the re-operation instruction key is enabled, the input operation therewith is performed, a process for the re-operation instruction key is executed.

17 Claims, 17 Drawing Sheets

FIG. 2A

INITIAL SETTING INFORMATION (SCAN TRANSMISSION MODE)

| COLOR MODE | AUTO |
|---|---|
| RESOLUTION | 200x200 |
| FILE FORMAT | PDF |
| DOCUMENT SIZE | A4 |
| SEND TO: | xxx.yy@aaa.bb.jp |

(COPY MODE)

| COPY DENSITY | AUTO |
|---|---|
| SHEET | A4 |
| MAGNIFICATION | 100% |
| NUMBER OF COPIES | 1 |

FIG. 2B

INITIAL SETTING INFORMATION (SCAN TRANSMISSION MODE)

| COLOR MODE | MONOCHROME |
|---|---|
| RESOLUTION | 100x100 |
| FILE FORMAT | PDF |
| DOCUMENT SIZE | B5 |
| SEND TO: | xxx.yy@aaa.bb.jp |

(COPY MODE)

| COPY DENSITY | AUTO |
|---|---|
| SHEET | A4 |
| MAGNIFICATION | 80% |
| NUMBER OF COPIES | 4 |

FIG. 2C

KEY VALID TIME SETTING VALUE

| KEY VALID TIME SETTING VALUE: | T0 | 5 (SECONDS) |
|---|---|---|

FIG. 2D

HUMAN BODY DETECTION INFORMATION

| HUMAN BODY DETECTION INFORMATION | YES | NO |
|---|---|---|

FIG. 2E

DOCUMENT PRESENCE-OR-ABSENCE INFORMATION

| DOCUMENT PRESENCE-OR-ABSENCE INFORMATION | YES | NO |
|---|---|---|

FIG. 2F

SELECTED FUNCTION INFORMATION

| SELECTED FUNCTION INFORMATION | COPY | FAX |
|---|---|---|
| | SCAN AND SAVE | SCAN AND TRANSMIT |

FIG. 9A

DISPLAY RE-EXECUTION KEY AND SETTING CHANGE KEY AFTER COMPLETION OF SCAN EXECUTION

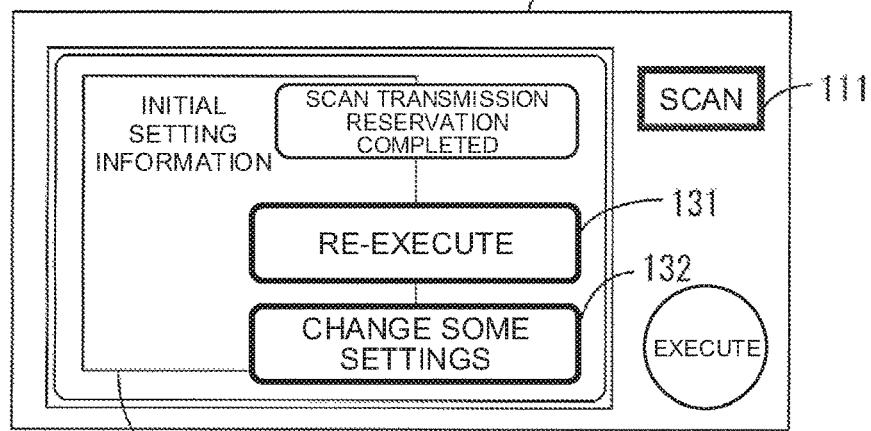

FIG. 9B

READ IMMEDIATELY PRECEDING SETTING INFORMATION AFTER INPUT OPERATION (TOUCH INPUT) IS APPLIED TO SETTING CHANGE KEY (SETTING CHANGE INPUT ENABLED STATE)

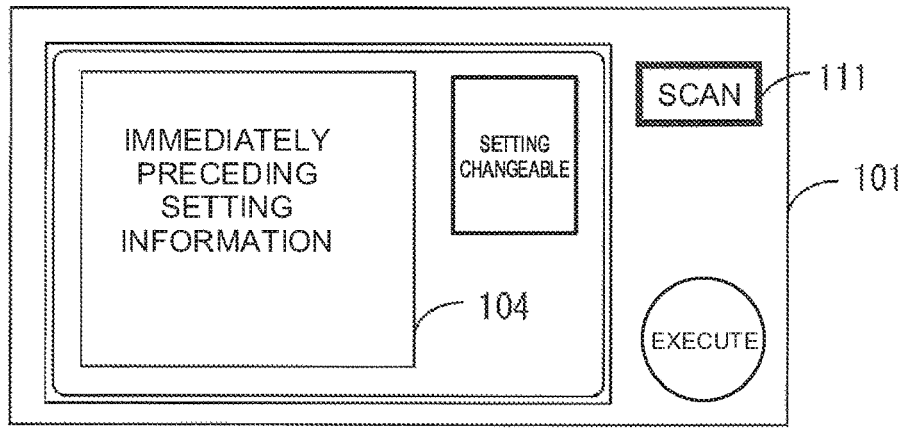

FIG. 9C

APPLY INPUT OPERATION TO EXECUTION KEY AFTER SETTING CHANGE OF IMMEDIATELY PRECEDING SETTING INFORMATION (EXECUTE SCAN WITH CHANGED SETTING)

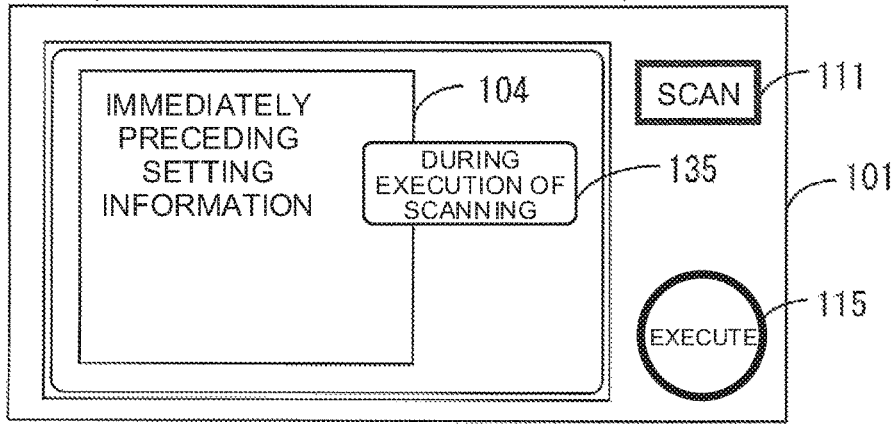

DISPLAY SETTING CHANGE EXECUTION KEY AFTER COMPLETION OF SCAN EXECUTION

DISPLAY RE-EXECUTION KEY AFTER DETECTION OF CHANGE IN PLACED DOCUMENT (REMOVAL OF DOCUMENT AND REARRANGEMENT OF DOCUMENT)

APPLY INPUT OPERATION TO RE-EXECUTION KEY (RE-EXECUTE SCAN WITH IMMEDIATELY PRECEDING SETTING INFORMATION)

DISPLAY RE-EXECUTION KEY AFTER COMPLETION OF SCAN EXECUTION

AFTER KEY VALID TIME ELAPSES SINCE RE-EXECUTION KEY IS DISPLAYED OR AFTER NO DETECTION OF HUMAN BODY BY MOTION SENSOR

INFORMATION PROCESSING APPARATUS

BACKGROUND OF THE INVENTION

Field of the Invention

The present invention relates to an information processing apparatus, and more particularly relates to an information processing apparatus having a function of re-executing a process executed immediately before in response to a predetermined input operation.

Description of the Background Art

Conventionally, in an image forming apparatus being one of the information processing apparatuses, when a user performs copying, for example, the user may change settings of copy conditions, such as a desired number of copies, copy magnification, and printing sheet size.

To prevent another user from performing copying under unintended copy conditions, after a fixed time period elapses since copying is performed under the copy conditions with settings changed, the copy conditions are returned, by an auto reset function, to the initial conditions that are previously fixed and stored.

Japanese Unexamined Patent Application Publication No. 6-175444 describes an image forming apparatus in which upon reaching a time when an auto reset function should be operated, the setting contents of a currently-displayed copy mode are stored, a basic screen for a standard copy mode is displayed, and if a specific recall key is depressed, the setting contents of the copy mode stored before the auto reset are displayed on the screen.

Japanese Unexamined Patent Application Publication No. 2006-184703 describes an image forming apparatus in which print conditions set by a user are stored in a memory, and after a printing operation under the print conditions ends, the processing shifts to a standby mode. In the image forming apparatus, during the standby mode, or when an energy-saving mode is cancelled, the display screen switches to a default display, and a setting call key for calling the print conditions previously set by the user and stored in the memory is displayed on the display screen.

However, in the conventional technique, it is necessary to enter an input with a specific key such as a recall key or a setting call key to call stored setting contents of a copy mode and print conditions set by a user, and in addition, after the setting contents and print conditions are called, it is necessary to enter an input with a start key indicating a start of printing or the like to execute an operation such as printing.

In addition, after print conditions set by a user A are called, if the user A executes a print operation, printing is executed under the print conditions intended by the user A, however, during a time period when the user A is temporarily away from the image forming apparatus after the print conditions are called, if another user B executes printing, the printing may be executed under the print conditions not intended by the other user B.

Further, if there are a large number of setting items for print conditions, printing is often executed without sufficiently checking the contents of all setting items, and as a result, printing may be executed under unintended print conditions.

In addition, if the same process is executed again with the same setting contents as the setting contents used in a previously executed process, the process is often executed by the same user, and in many cases, after a user executes the previous process, the same user only, for example, replaces a document and re-executes the same process with the same setting contents as before without giving too much time since the previous process.

Therefore, the present invention has been made in view of the above circumstances, and an object thereof is to provide an information processing apparatus capable of reducing an operation load on a user when, after the user executes a predetermined function with desired setting contents, the user re-executes the same process either with the same setting contents as the desired setting contents, or with setting contents in which some of the settings are changed, and preventing another user from executing a predetermined function with unintended setting contents.

SUMMARY OF THE INVENTION

The present invention provides an information processing apparatus comprising: an operation device that allows a predetermined input operation to be performed, a key activation setter that sets whether to enable or disable the predetermined input operation, a function executer that executes a function selected by the operation device, and a storage that stores immediately preceding setting information containing setting values of setting items of a function executed immediately before, in which the operation device includes re-operation instruction keys that instruct an operation related to a function executed immediately before, and after the function selected is executed by the function executer, setting values of setting items used when the function selected is executed are stored as the immediately preceding setting information, and the key activation setter enables an input operation with a re-operation instruction key, for a fixed time period, and if, within a time period during which the input operation with the re-operation instruction key is enabled, the input operation with the re-operation instruction key is performed, the function executer executes a process associated with the re-operation instruction key.

Further, the re-operation instruction keys include a re-execution key for re-executing a function identical to the function executed immediately before, and a setting change key for changing setting contents of setting items for executing the function selected.

After the function selected is executed by the function executer, the key activation setter enables an input operation with the re-execution key out of the re-operation instruction keys, for a fixed time period, and if, within a time period during which the input operation with the re-execution key is enabled, the input operation with the re-execution key is performed, the function executer re-executes the function identical to the function executed immediately before with contents identical to the setting values of the setting items contained in the immediately preceding setting information.

Further, after the function selected is executed by the function executer, the key activation setter enables an input operation with the setting change key out of the re-operation instruction keys, for a fixed time period, and if, within a time period during which the input operation with the setting change key is enabled, the input operation with the setting change key is performed, the setting values of the setting items contained in the immediately preceding setting information are set to be changeable, and if the setting values of the setting items are changed through the operation device, the immediately preceding setting information is updated.

Further, after the function selected is executed by the function executer, the key activation setter enables an input operation with the re-execution key and an input operation with the setting change key, for a fixed time period, if, within a time period during which the input operation with the re-execution key is enabled, an input operation with the re-execution key is performed, the function executer re-executes the function identical to the function executed immediately before with contents identical to the setting values of the setting items contained in the immediately preceding setting information, and if, within a time period during which the input operation with the setting change key is enabled, the input operation with the setting change key is performed, the setting values of the setting items contained in the immediately preceding setting information are set to be changeable, and if the setting values of the setting items are changed through the operation device, the immediately preceding setting information is updated.

Further, after the time period during which the input operation with the re-execution key is enabled elapses, the key activation setter disables the input operation with the re-execution key.

Further, after the time period during which the input operation with the setting change key is enabled elapses, the key activation setter disables the input operation with the setting change key.

In the storage, initial setting information containing initial values of setting items is stored in advance, and current setting information containing current setting values of setting items for executing the function selected is stored, and if, within the time period during which the input operation with the re-operation instruction key is enabled, the input operation with the re-operation instruction key is not performed, then after the time period during which the input operations with the re-operation instruction key is enabled elapses, setting change is effected to change the current setting information to the initial setting information.

The information processing apparatus further includes a display in which after the function selected is executed by the function executer, if the key activation setter enables an input operation with the re-execution key out of the re-operation instruction keys, for a fixed time period, a display area corresponding to the re-execution key is displayed on the display, and if, within a time period during which the input operation with the re-execution key is enabled, an input operation for selecting the display area corresponding to the re-execution key is performed, the function executer re-executes the function identical to the function executed immediately before with contents identical to the setting values of the setting items contained in the immediately preceding setting information.

The information processing apparatus further includes a display in which after the function selected is executed by the function executer, if the key activation setter enables an input operation with the setting change key out of the re-operation instruction keys, for a fixed time period, a display area corresponding to the setting change key is displayed on the display, and if, within a time period during which the input operation with the setting change key is enabled, an input operation for selecting the display area corresponding to the setting change key is performed, the setting values of the setting items contained in the immediately preceding setting information are made changeable, and if the setting values of the setting items are changed through the operation device, the immediately preceding setting information is updated.

The information processing apparatus further includes a motion sensor that detects a human body existing within a predetermined detection range, and if a state in which no human bodies are detected by the motion sensor continues for a fixed time period or longer, the key activation setter disables an input operation with the re-execution key and an input operation with the setting change key.

The information processing apparatus further includes a document detector that detects whether a document is placed on a document platen, and after the function selected is executed by the function executer, and the key activation setter enables an input operation with the setting change key out of the re-operation instruction keys, for a fixed time period, if the document detector detects that the document is changed, an input operation with the re-execution key is enabled, and the input operation with the setting change key is disabled.

The information processing apparatus further includes display elements corresponding to the re-execution key and the setting change key, respectively, for checking whether input operations with the re-execution key and the setting change key are enabled or disabled, and if an input operation with either the re-execution key or the setting change key is set to be enabled, the display element corresponding to the key set to be enabled from among the re-execution key and the setting change key is turned on or caused to flash on and off.

Further, the function executer executes functions including a copy function of copying a document, a document reading function of reading and storing a document, and a document transmission function of reading and transmitting a document.

Further, the present invention provides a method of controlling re-execution of an information processing apparatus, the information processing apparatus includes an operation device that allows a predetermined input operation to be performed, a key activation setter that sets whether to enable or disable the predetermined input operation, a function executer that executes a function selected by the operation device, and a storage that stores immediately preceding setting information including setting values of setting items of a function executed immediately before. In the method, the operation device includes a re-execution key for re-executing a function identical to the function executed immediately before, and a setting change key for changing setting contents of setting items for executing the function selected. The method includes selecting, through the operation device, a function to be executed, after the function selected is executed by the function executer, storing setting values of setting items used when the function selected is executed, in the storage as the immediately preceding setting information, and enabling, with the key activation setter, an input operation with at least one or both of the re-execution key and the setting change key, for a fixed time period. If, within a time period during which an input operation with the re-execution key is enabled, the input operation with the re-execution key is performed, re-executing a function identical to the function executed immediately before with contents identical to the setting values of the setting items contained in the immediately preceding setting information. If, within a time period during which an input operation with the setting change key is enabled, the input operation with the setting change key is performed, setting the setting values of the setting items contained in the immediately preceding setting information to be changeable, and if the setting values of the setting items are changed through the operation device, updating the immediately preceding setting information.

According to the present invention, after the selected function is executed by the function executer, setting values of setting items used when the selected function is executed is stored as the immediately preceding setting information, the key activation setter enables an input operation with each of the re-operation instruction keys, for a fixed time period, and if, within a time period during which an input operations with the re-operation instruction key is enabled, an input operation with the re-operation instruction key is performed, the function executer executes a process associated with the re-operation instruction key, and therefore, after a user executes the selected function with desired setting values of the setting items, a process associated with the re-operation instruction key can be executed easily and promptly with a relatively less number of operating procedures. For example, it is possible to reduce the operation load on the user when the same process is re-executed with the same setting values as the desired setting values of the setting items, or with setting contents in which some of the setting items have been changed, and it is also possible to prevent another user from executing a predetermined function with unintended setting contents.

BRIEF DESCRIPTION OF THE DRAWINGS

FIGS. 2A to 2F are tables for explaining an example of information stored in a storage of the information processing apparatus according to the present invention;

FIGS. 9A to 9C are explanatory diagrams of an example of a change in a display screen, when immediately preceding setting information is displayed after an input with the displayed setting change key, until a scan function is re-executed with the changed immediately preceding setting information;

DESCRIPTION OF THE PREFERRED EMBODIMENTS

Below, embodiments of the present invention will be described using the drawings. It is noted that the present invention shall not be limited in any way by the description of examples below.

Although the present invention relates to an information processing apparatus described below, the present invention is also applicable to other image forming apparatuses, image reading apparatuses, and the like.

Configuration of Information Processing Apparatus

Figure 1:
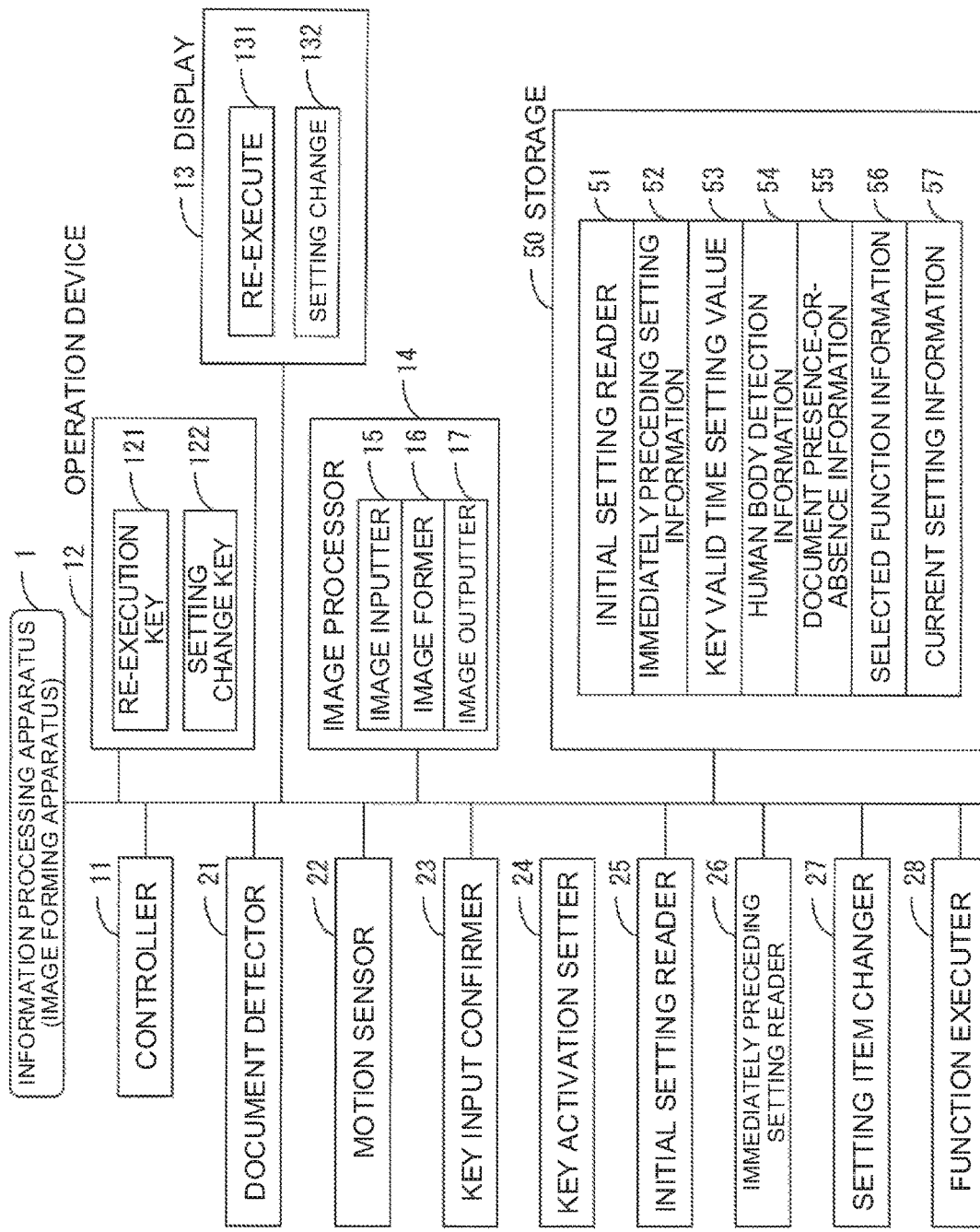
FIG. 1 is a block diagram illustrating a configuration of an example of an information processing apparatus according to the present invention.

FIG. 1 is a block diagram illustrating a configuration of an example of an information processing apparatus according to the present invention.

Here, a configuration of an image forming apparatus being one of the information processing apparatuses will be described.

An image forming apparatus (hereinafter, also referred to as "multifunction peripheral (MFP)") 1 is an apparatus for processing image data, and for example, is an electronic equipment having a copying function, a print function, a document reading function (scan function), a document editing function, a FAX function, a communication function, or the like.

The image forming apparatus 1 according to the present invention includes a document platen on which a document to be read is placed, and a document cover that holds the document in place, and has a function of detecting the presence or absence of a document placed on the document platen.

The image forming apparatus 1 includes a motion sensor that detects that a user using the image forming apparatus exists in the vicinity of the image forming apparatus and executes a desired function of the image forming apparatus.

In FIG. 1, the image forming apparatus (MFP) 1 according to the present invention mainly includes a controller 11, an operation device 12, a display 13, an image processor 14, a document detector 21, a motion sensor 22, a key input confirmer 23, a key activation setter 24, an initial setting reader 25, an immediately preceding setting reader 26, a setting item changer 27, a function executer 28, and a storage 50.

Here, the operation device 12 has a plurality of physical operation keys requiring an operation such as a depressing operation by a user.

In the present invention, particularly, the operation device 12 includes a re-operation instruction key through which an operation related to a function executed immediately before is instructed. The re-operation instruction key includes a re-execution key 121 and a setting change key 122 described later.

If a touch panel is used in the display 13, then in a predetermined time zone, a display area 131 for a re-execution, corresponding to the re-execution key 121 and a display area 132 for a setting change, corresponding to the setting change key 122 may be displayed on the display 13 instead of the re-execution key 121 and the setting change key 122. If such display areas (131, 132) are displayed, the re-execution key 121 and the setting change key 122 may not be provided.

The image processor 14 includes an image inputter 15, an image former 16, and an image outputter 17, as described later.

The controller 11 controls operations of constituent components such as the operation device and the image processor, and is mainly realized by a microcomputer including a CPU, a ROM, a RAM, an I/O controller, a timer, and the like.

The CPU organically operates various hardware based on a control program stored in advance in the ROM or the like, and executes an image processing function, a document detection function, a setting item change function, and the like in the present invention.

Among the above-described constituent components, the key input confirmer 23, the key activation setter 24, the initial setting reader 25, the immediately preceding setting reader 26, and the setting item changer 27 are functional blocks in which the CPU executes the processing for the functional blocks, based on a predetermined program.

The operation device 12 is an input device through which a user of the image forming apparatus performs a predetermined input operation. For example, the operation device 12 is a component through which information such as characters is input and a function is selected and input, and includes a keyboard, a mouse, and a touch panel.

Figure 12A:
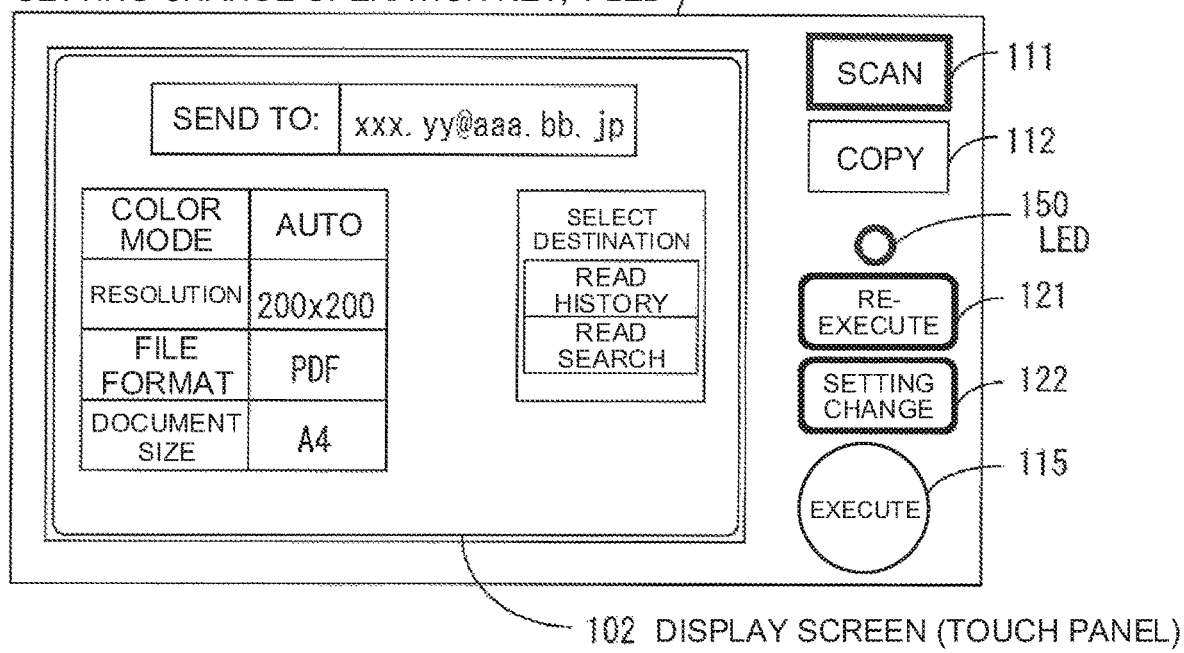
FIGS. 12A and 12B are explanatory diagrams of an example of an operation panel including operation keys for performing a re-execution and a setting change, and an LED indicating whether operation inputs with the operation keys are enabled.
Figure 12B:
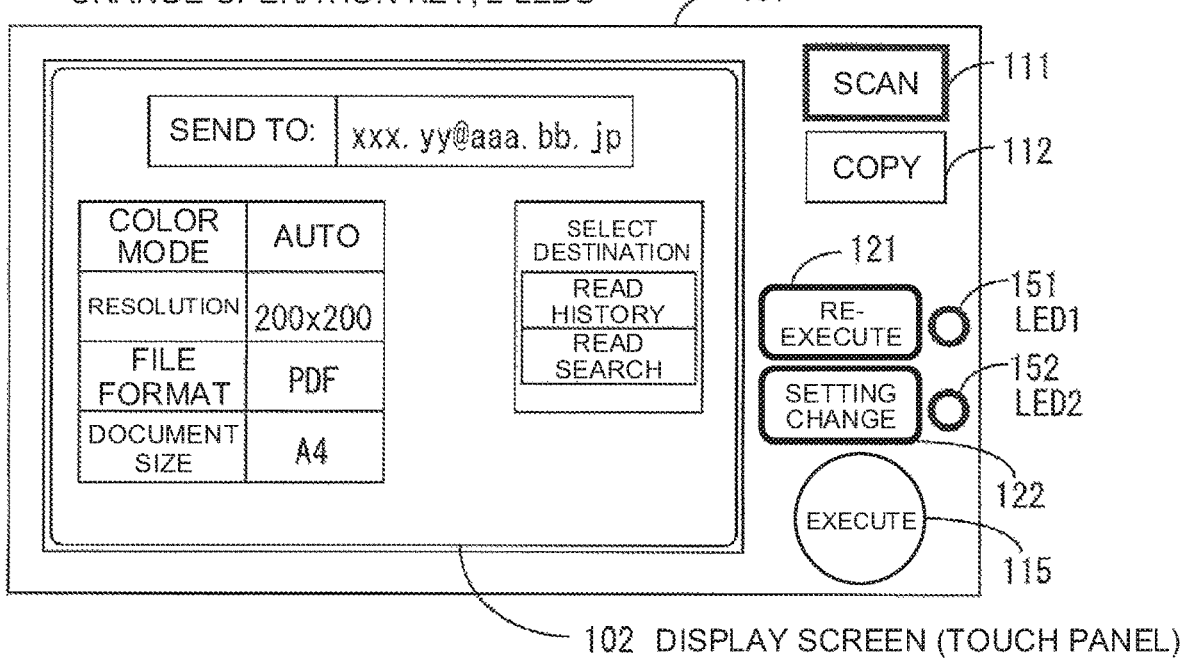

In the operation device 12, keys operated by the user include function selection keys 110, a function start key 115, the re-execution key 121, the setting change key 122, and the like as illustrated in FIG. 3 and FIGS. 12A and 12B described later.

The function start key 115 is a key for starting execution of a currently selected function, and is also called an execution key.

The function selection keys 110 are keys for selecting a function to be executed from among a plurality of functions available in the image forming apparatus. The function selection keys 110 may be provided for frequently used functions among the functions available in the image forming apparatus, and may include, for example, a scan key 111, a copy key 112, and a fax key.

The re-execution key 121 is a key for re-executing the same function as the function executed immediately before.

The setting change key 122 is a key for changing setting contents of setting items for executing the selected function.

The re-execution key 121 and the setting change key 122 correspond to the above-described re-operation instruction keys.

The re-operation instruction keys are not limited to the re-execution key 121 and the setting change key 122, and, for example, an immediately preceding setting display request key for displaying a setting content of a setting item used in a function executed immediately before also corresponds to the re-operation instruction keys.

In the present invention, particularly, after the selected function is executed by the function executer 28 described later, setting values of setting items used when the selected function is executed are stored as immediately preceding setting information, and the key activation setter 24 enables an input operation with a re-operation instruction key, for a fixed time period, and if an input operation with the re-operation instruction key is performed within the time period during which the input operation with the re-operation instruction key is enabled, the function executer 28 executes a process associated with the re-operation instruction key.

If a user desires to execute a copy function, the user may select the copy key 112 and enter an input with the copy key 112 of the function selection keys 110.

If the user selects the copy key 112 and enters an input with the copy key 112, the mode shifts to a copy mode, and it comes into a state allowing for execution of the copy function. If the mode shifts to the copy mode, current setting values of setting items required for copying are displayed on the display screen so that the user can change the current setting values of the setting items as needed.

The display 13 is a component that displays information, and displays information necessary for executing each of the functions, and an execution results of a function, and the like to notify a user. For example, if an LCD, an organic EL display, or the like is employed for the display 13 and a touch panel is employed for the operation device 12, the display and the touch panel are arranged to overlap each other.

On the display 13, for example, information such as setting items used for executing the print function and the document reading function of the image forming apparatus, a display area for performing a selection and input operation, or the like is displayed using characters, symbols, images, icons, and the like.

Figure 3A:
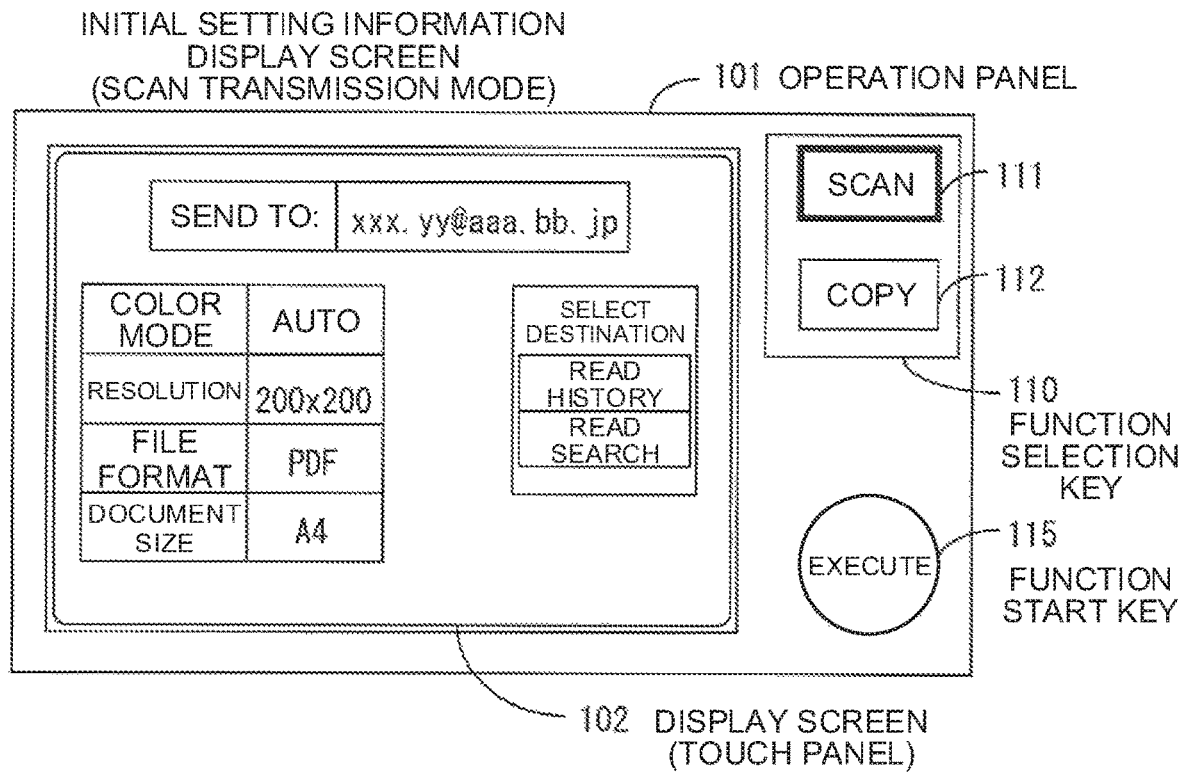
FIGS. 3A and 3B are explanatory diagrams of an example of a display screen of initial setting information displayed on a display according to the present invention.
Figure 3B:
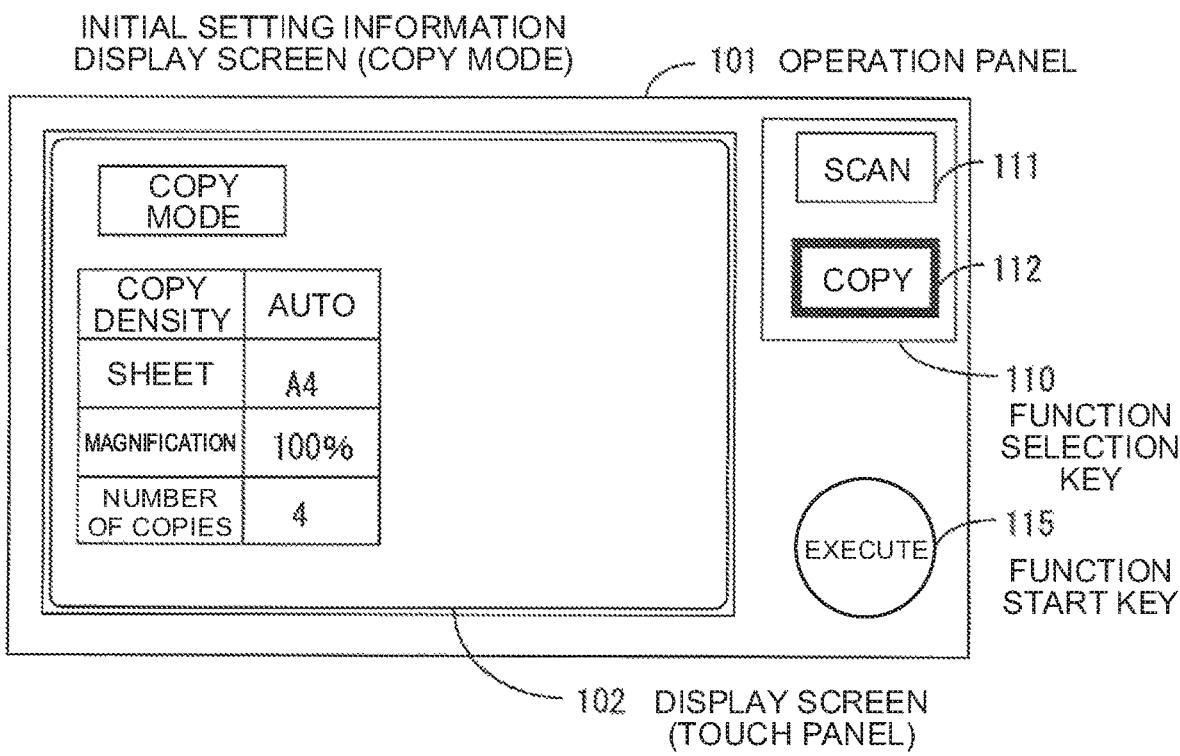

FIGS. 3A and 3B illustrate a schematic view of an example of an operation panel when a touch panel is employed for the operation device 12.

On an operation panel 101 illustrated in FIGS. 3A and 3B, mainly, the display 13 having a display screen 102, the function selection keys 110 (the scan key 111 and the copy key 112), the function start key 115, and the like are arranged.

The display screen 102 corresponding to the selected function is displayed on the display 13, and a touch panel is arranged to overlap the display screen 102.

Examples of the display screen 102 include a screen displaying the initial setting information in FIGS. 3A and 3B and a screen as illustrated in later-described FIGS. 4A and 4B, for example.

The display screen 102 displays current setting values of a plurality of setting items including a color mode, a document size, and the like.

If the user selects the display area of the setting items displayed on the display screen 102 for entering an input, an input operation of changing the contents of the setting items is performed.

Figure 4A:
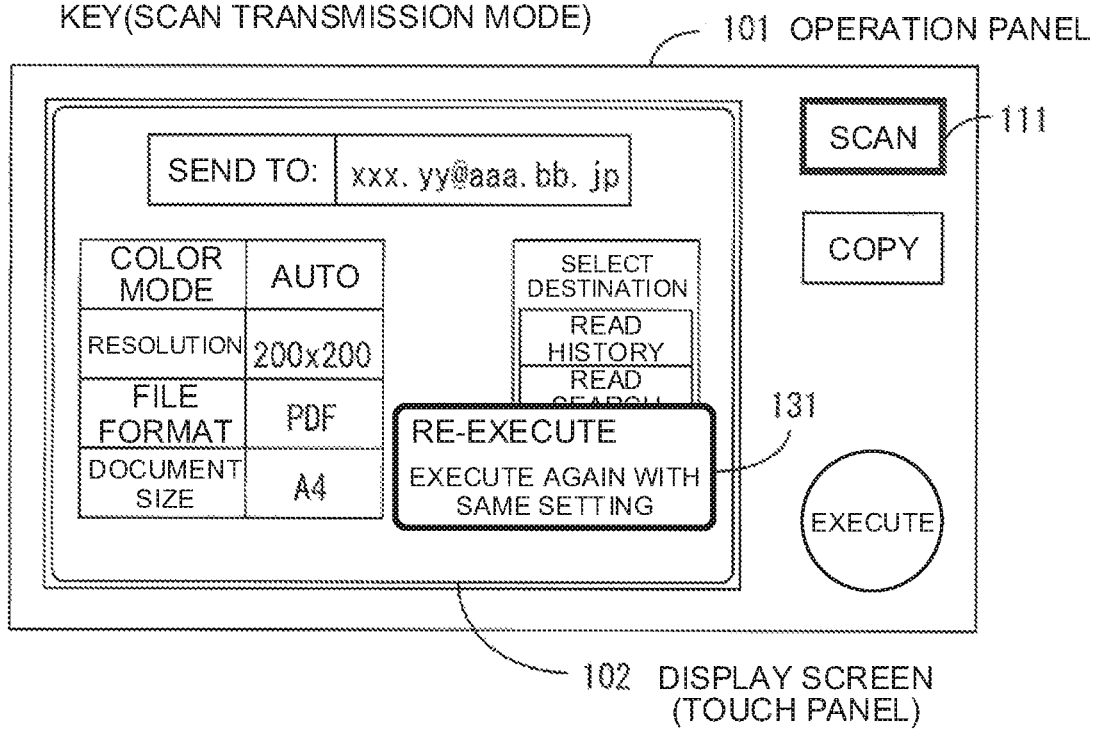
FIGS. 4A and 4B are explanatory diagrams of an example of a display screen displaying a re-execution key and a setting change key.
Figure 4B:
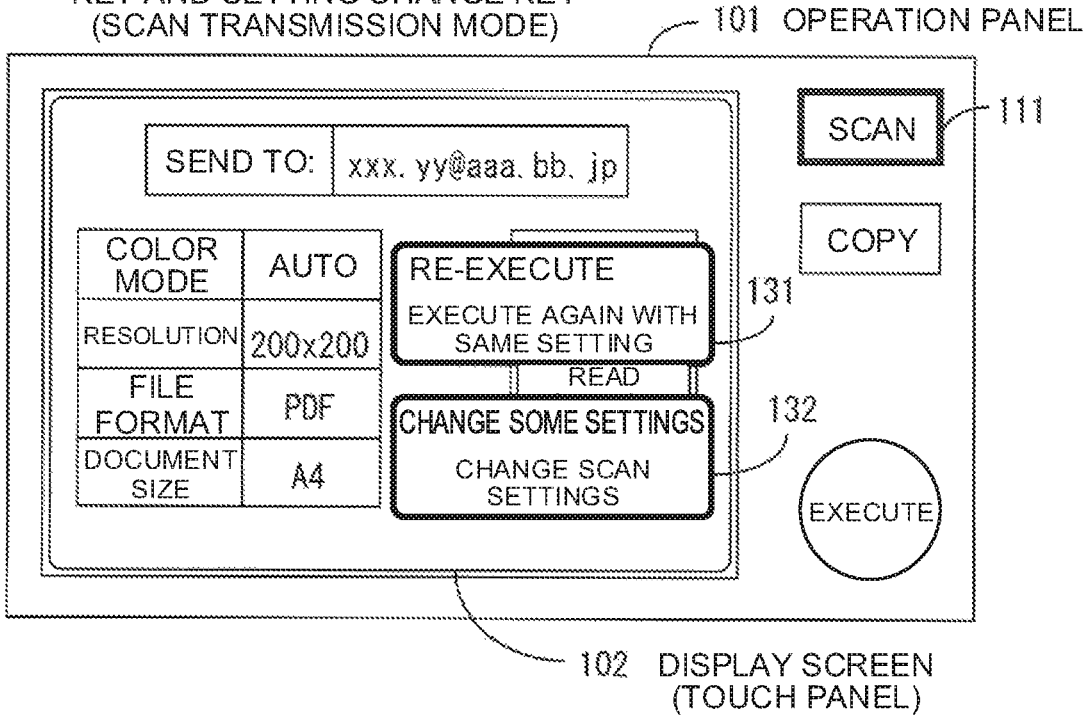

As illustrated in FIGS. 4A and 4B, for example, if a predetermined condition is satisfied after a predetermined function is executed, the display area 131 corresponding to the re-execution key, the display area 132 corresponding to the setting change key, or the like is displayed on the display screen 102.

The image processor 14 is a component that executes an image forming function being an original function of the image forming apparatus, and mainly includes the image inputter 15 that receives predetermined image data, the image former 16 that converts the received image data to information that can be printed or the like, the image outputter 17 that outputs the formed print information or the like on a print sheet or the like.

The image inputter 15 is a component that receives image data, for example, receives information such as a document in which an image, a character, a graphic, and the like are described.

A scanner (reader) that reads a document on which information is printed is employed for the image inputter 15.

A method of receiving image information includes various methods, for example, reading, by a scanner, a document on which a print image is provided, and storing the image data of the print image in the storage 50.

Alternatively, for example, an interface connecting an external storage medium such as a USB memory corresponds to the image inputter.

An electronic data file of image information, or the like to be input may be saved in an external storage medium such as a USB memory, the USB memory, and the like may be connected to an input interface such as a USB terminal, and a predetermined input operation may be performed in the operation device 12 to read the desired electronic data file saved in the USB memory, and the like, and store the electronic data file in the storage 50 as image data.

The image forming apparatus may connect to an information processing apparatus such as a personal computer or a server in which image information, and the like is stored in advance via a network such as the Internet, and may receive the image information, and the like by data communication. Further, a sheet on which image information is described may be photographed by a camera having a communication function, and the image forming apparatus may connect to the camera by wireless communication and receive the photographed image information.

The image former 16, for example, if image data is printed on a recording medium, generally performs charging, exposure, development, transfer, cleaning, electricity removal, and fixing processes in continuation, and forms the image data on the recording medium.

In the development process, toner is supplied from a toner cartridge to a developing device, an electrostatic latent image formed on the surface of a charged photoreceptor drum is developed, and a toner image corresponding to the electrostatic latent image is formed. The toner image formed on the surface of the photoreceptor drum is transferred onto the recording medium by a transfer device, and is then fixed on the recording medium by being heated by a fixing device.

The image former 16 converts the received image data into information in a transferable or displayable form.

The image outputter 17 is a component that outputs the formed image data, for example, corresponds to a printer, and outputs a print image transferred and fixed on a predetermined print sheet (paper medium).

The output of image data is not limited to printing, and may be storage of image data in an external storage medium such as a USB memory, or transmission of image data to another information processing apparatus or server via a network such as the Internet.

The document detector 21 is a component that detects whether a document is placed on the document platen, and mainly includes a light emitter and a light receiver.

The document platen (hereinafter, also referred to as "platen") is a table on which a document is placed, and has a document placing area on which a document is placed. The document placing area made of, for example, a transparent glass plate is provided on the upper surface of the platen, and a document sheet is placed on the document placing area.

A document cover being a member for pressing a document sheet placed on the document placing area, from above is connected to the document platen and is attached to the document platen in an openable manner.

If the document cover fully closes, the document placing area is covered by the document cover.

A light emitting diode (LED) is employed for the light emitter, for example, and is mounted on the document cover openably attached to the document platen so that light emitted from the light emitting diode is directed toward the document placing area.

The light receiver is a light receiving element that receives the light emitted from the light emitter. For example, a photodiode (PD) capable of receiving visible light of a predetermined wavelength is employed for the light receiver arranged on an inner side surface of the document platen and below the document placing area.

That is, the light emitter and the light receiver are respectively arranged on opposite sides of the document platen.

If the document cover is closed, a light beam emitted from the light emitter passes through the transparent document placing area and is received by the light receiver.

If the light beam emitted from the light emitter is received by the light receiver, it is determined that a document is not placed.

On the other hand, if a document is placed on the platen, a light beam emitted from the light emitter is blocked by the document, and thus, is not received by the light receiver. Therefore, if a light beam emitted from the light emitter is not received by the light receiver, it is determined that a document is placed.

If the document detector 21 detects that a document is placed on the platen, information (document present) indicating that a document is placed is stored in document presence-or-absence information 55.

If the document detector 21 detects that a document is not placed on the platen, information (no document) indicating that a document is not placed is stored in the document presence-or-absence information 55.

The motion sensor 22 is a sensor for detecting a human body and other objects existing within a predetermined detection range.

Examples of the motion sensor 22 include a pyroelectric infrared sensor (hereinafter, also referred to as "pyroelectric sensor") capable of detecting infrared rays emitted from a human body and an optical sensor.

The pyroelectric sensor outputs a detection signal if a human body exists within a predetermined detection range.

The detection signal is output as a signal having an intensity corresponding to a distance up to the detected human body, and is received by the controller 11.

The intensity of the received detection signal is measured and compared with a predetermined threshold value, and if, for example, a detection signal having the intensity larger than the threshold value is received, it is determined that a human body is detected, and if a detection signal having the intensity equal to or below the threshold value is received, it is determined that a human body is not detected.

It is also possible to measure a distance from the image forming apparatus to a position where a human body exists by measuring the intensity of the received detection signal.

The key input confirmer 23 is a component that confirms whether an operation of entering an input with a predetermined key is performed. The keys here include, in particular, the "re-execution key" 121 and the "setting change key" 122 provided on the operation device 12. If the touch panel is used and the display area 131 corresponding to the "re-execution key", and the display area 132 corresponding to the "setting change key" are displayed on the display screen 102 of the display 13, the key input confirmer 23 confirms whether an input of touching the display areas (131, 132) is performed.

For example, if a touch input operation is performed on the display area 131 corresponding to the "re-execution key", in which the characters indicating "re-execute" are displayed, the key input confirmer 23 assumes that the "re-execution key" 121 is input.

The key activation setter 24 is a component that sets whether to enable or disable an input operation.

For example, the key activation setter 24 sets whether to enable or disable the input operation for a predetermined key. If the input operation is set to be enabled, the input of the key is accepted, and if the input operation is set to be disabled, the input of the key is ignored.

Normally, if a key input operation is performed, the key input operation is processed to be enabled, and the function associated with the key is executed.

If an input entered with a specific key is set to be enabled, and an input operation with the specific key is actually performed, the key input is processed to be enabled, however, in a case where an input entered with a specific key is set to be disabled, even if an input operation with the specific key is actually performed, the key input is not processed to be enabled.

That is, in a case where an input entered with a key is set to be disabled, even if an input operation with the key is actually performed, the function associated with the key is not executed.

Moreover, when a display area corresponding to a key of the operation device is displayed on the display screen, if a touch input operation on the display area corresponding to the key is set to be enabled, the display area corresponding to the key is displayed on the display screen, and if a touch input on the display area corresponding to the key is set to be disabled, the display area corresponding to the key is not displayed.

In the present invention, the key activation setter 24 sets an enabled or disabled input operation on one or both of the "re-execution key" 121 and the "setting change key" 122 of the re-operation instruction keys provided in the operation device 12.

In particular, after the selected function is executed by the function executer 28, the key activation setter 24 enables an input operation with one or both of the "re-execution key" 121 and the "setting change key" 122 for a fixed time period.

If the key activation setter 24 enables an input operation with the re-execution key 121 of the re-operation instruction keys, for a fixed time period, the display area 131 corresponding to the re-execution key 121 is displayed on the display 13.

Similarly, if an input operation with the setting change key 122 is enabled, the display area 132 corresponding to the setting change key 122 is displayed on the display 13.

Further, if both the "re-execution key" 121 and the "setting change key" 122 are set to be enabled, the display areas (131, 132) corresponding to the "re-execution key" 121 and the "setting change key" 122 are displayed on the display screen, and if both the keys are set to be disabled, the display areas (131, 132) corresponding to the "re-execution key" 121 and the "setting change key" 122 are not displayed on the display screen.

In the following example, a display timer that measures a time period during which input operations with the two keys (121, 122) are enabled is provided, the time period during which input operations with the two keys (121, 122) are enabled is set to the display timer, and then the display timer is activated.

While a time period during which input operations with the keys are enabled is measured, the input operations with the two keys (121, 122) are enabled, and the display areas (131, 132) corresponding to the two keys (121, 122) are displayed on the display screen.

On the other hand, after the display timer times out and the time period during which the input operations with the keys are enabled elapses, the key activation setter 24 disables the input operations with the two keys (121, 122) and does not display the display areas (131, 132) corresponding to the two keys (121, 122) on the display screen.

A time period during which the input operations with the above two keys (121, 122) are enabled is stored in advance as the key enabled time setting value 53 described later.

Moreover, a display element (LED) for checking whether the input operations with the re-execution key 121 and the setting change key 122 are enabled or disabled may be provided in the vicinity of the two keys as illustrated in FIGS. 12A and 12B described later so that a user can easily check whether the input operations with the two keys (121, 122) are currently enabled or disabled.

Here, one display element (LED) may be provided, but the display element (LED) may be provided for each of the re-execution key 121 and the setting change key 122.

For example, if the input operation with either the re-execution key 121 or the setting change key 122 is set to be enabled, the display element (LED) associated with each of the keys may be lit up or flashed, and if the input operation with the key is set to be disabled, the LED may be turned off.

The initial setting reader 25 is a component that reads initial setting information of the setting items necessary for executing a predetermined function, from the storage 50.

The initial setting information is contents (initial values) of setting items set in advance by a person in charge of management, and for example, when the information processing apparatus is shipped or installed, is semi-fixedly stored in the storage 50.

For example, when a user executes the copy function, it is necessary to set in advance a plurality of setting items such as a copy density, a print sheet size, a magnification, and the number of copies as the copy conditions before starting copying, and the initial setting information is stored in the storage 50 as initial values of the plurality of setting items.

If the copy function is selected, when the initial setting information is used as a condition for executing the copy function, the initial setting information stored in the storage 50 is read and set to (set to and stored in) current setting information 57 described later, and the contents of the initial setting information are displayed on the display screen as the contents of the current setting items used for copying.

The current setting information (hereinafter, also simply referred to as "current setting") refers to current setting values of setting items for executing a selected function, and if an input is entered with the key for starting the function (the execution key 115), the selected function is executed with the contents (setting values) of the setting items set to the current setting.

The immediately preceding setting reader 26 is a component that reads immediately preceding setting information of setting items necessary for executing a predetermined function, from the storage 50.

The immediately preceding setting information is setting values of setting items of a function executed immediately before, that is, the contents of the latest setting items as viewed from the current time, and the information stored in the storage 50.
The immediately preceding setting information is information changeable by a user, and is updated to the latest information each time the setting contents (setting values) of the setting items are changed.

In addition, after the selected function is executed, the current setting being the condition under which the function is executed is stored as the immediately preceding setting information.

Further, as will be described later, if an input is entered with the re-execution key 121, or if a touch input operation is performed on the display area 131 corresponding to the re-execution key 121, the immediately preceding setting information stored in the storage 50 is read, set to the current setting, and the contents of the immediately preceding setting information are displayed on the display screen as the contents of the current setting items.

The setting item changer 27 is a component that changes the current setting being the contents of the current setting items used in the selected function.

The contents of the setting items are changed when a user uses the operation device 12 to perform a predetermined input operation while checking the displayed setting items.

For example, when the copy function is selected, if a user desires to change the print sheet size from among the displayed setting items, the user may select a display area of the displayed print sheet size for entering an input, and then perform operations for selecting and inputting a desired print sheet size from a list display of the plurality of displayed print sheet sizes. Thus, the content of the print sheet size for the current setting is changed.

The function executer 28 is a component that executes a function selected by the operation device 12.

As described above, if an input is entered with the key for starting a function (the execution key 115), the selected function is executed with the contents of the setting items set to the current setting.

For example, if an input is entered with the execution key 115 while the copy function is selected, the image forming apparatus executes a series of operations of reading a document by the image inputter 15, forming an image to be printed on a print sheet by the image former 16 based on the read image data, and outputting the print sheet on which the image of the document is formed, by the image outputter 17.

In the image forming apparatus corresponding to the information processing apparatus, examples of the functions executed by the function executer 28 include a copy function for copying a document, a document reading function (scan and storage function) for reading and storing a document, a document transmitting function (scan and transmission function) for reading and transmitting a document, a fax function, a file print function, and an OCR function.

The storage 50 is a component that stores information and programs necessary for executing each of the functions of the image processing device according to the present invention, and may include a semiconductor storage element such as a ROM, a RAM, and a flash memory, a storage device such as an HDD and an SSD, or another storage medium.

The storage 50 stores, for example, initial setting information 51, immediately preceding setting information 52, a key enabled time setting value 53, human body detection information 54, the document presence-or-absence information 55, selected function information 56, and the current setting information 57.

FIGS. 2A to 2F are tables for explaining an example of the information stored in the storage 50.

The initial setting information 51 is information storing initial values of setting items, and for example, initial values of setting items are stored in advance for each function that can be executed by the information processing apparatus.

FIG. 2A shows an example of initial values of setting items used in the scan and transmission function (scan and transmission mode) and the copy function (copy mode).

In the scan and transmission mode shown in FIG. 2A, for example, initial values of setting items such as a color mode, a resolution, a file format, a document size, and Send To: are stored.

In the copy mode shown in FIG. 2A, for example, initial values of setting items such as a copy density, a print sheet, a magnification, and the number of copies are stored.

The initial values of the setting items are not limited thereto.

In principle, if a desired function is selected by performing an input operation with the function selection key, the initial setting information 51 of the selected function is read from the storage 50 and displayed on the display 13.

Usually, if an input for starting the selected function is performed without changing the contents of the setting items, the function is executed based on the initial values of the setting items stored as the initial setting information 51.

In addition, if the information processing apparatus does not have an input operation for a fixed time period or longer, or if a fixed time period or longer elapses without detecting a human body by the motion sensor, the contents of the initial setting information 51 are set to the current setting even though the immediately preceding setting information is set to the current setting, and the information processing apparatus returns to a state in which the function can be executed based on the initial values of the setting items.

The immediately preceding setting information 52 is information storing setting values of setting items of a function executed immediately before, as viewed from the current time, and may be stored for each function that can be executed by the information processing apparatus.

FIG. 2B shows an example of setting values of setting items in the scan and transmission function (scan and transmission mode) and the copy function (copy mode) obtained when the scan and transmission function and the copy function are executed immediately before.

In the immediately preceding setting information 52 of the scan and transmission mode shown in FIG. 2B, the color mode, the resolution, and the document size are changed as compared with the initial setting information 51.

The contents of the immediately preceding setting information 52 of the scan and transmission mode are contents of setting items used in the scan and transmission function executed immediately before.

In the immediately preceding setting information 52 of the copy mode shown in FIG. 2B, the magnification and the number of copies are changed as compared with the initial setting information 51.

As will be described later, if, within a time period during which an input operation with the re-execution key 121 is enabled, an input is entered with the re-execution key 121, or if, while the display area 131 corresponding to the re-execution key 121 is displayed, an input operation for selecting the display area 131 is performed, the contents of the setting items stored in the immediately preceding setting information 52 are read, the immediately preceding setting information 52 is set to the current setting and displayed on the display 13, and further, the function executer 28 re-executes automatically the same function as the function executed immediately before, with the same contents as the setting values of the setting items stored in the immediately preceding setting information 52.

In addition, if, within a time period during which an input operation with the setting change key 122 is enabled, an input is entered with the setting change key 122, or if, while the display area 132 corresponding to the setting change key 122 is displayed, an input operation for selecting the display area 132 is performed, the contents of the setting items stored in the immediately preceding setting information 52 are read, the immediately preceding setting information 52 is set to the current setting and displayed on the display 13, and the setting values of the setting items stored in the displayed immediately preceding setting information 52 are set to be changeable. Further, if the setting values of the setting items are changed through the operation device, the immediately preceding setting information 52 is updated.

As described above, the key enabled time setting value 53 is a time period during which input operations with the "re-execution key" 121 and the "setting change key" 122 are enabled.

The key enabled time setting value 53 is also a time period during which the display area 131 corresponding to the "re-execution key" 121 and the display area 132 corresponding to the "setting change key" 122 are displayed on the display screen.

As shown in FIG. 2C, for example, five seconds is preset and stored for the key enabled time setting value (T0) 53.

As will be described later, the display area 131 corresponding to the "re-execution key" 121 is displayed, the display timer for measuring the five seconds set to the enabled time setting value 53 is activated, and after the five seconds set to the key enabled time setting value 53 elapse, the display area 131 is deleted and the "re-execution key" 121 is disabled even if an input is entered with the "re-execution key" 121. As a result, it is no longer possible to re-execute the selected function with the contents of the setting items stored in the immediately preceding setting information 52.

On the contrary, if an input is entered with the "re-execution key" 121 or on the display area 131 corresponding to the "re-execution key" 121 before the five seconds set to the key enabled time setting value 53 elapse, the selected function is re-executed with the contents of the setting items stored in the immediately preceding setting information 52.

The human body detection information 54 is information storing the presence or absence of a human body detected by the motion sensor 22.

As shown in FIG. 2D, "Detection of human body" or "No detection of human body (No detected human body)" is stored in the human body detection information 54.

A detection signal output from the motion sensor 22 is used to store the presence or absence of a detected human body.

Alternatively, if a state of "Detection of human body" continues for a fixed time period or longer, it may be determined that a human body is detected and "Detection of human body" may be stored, and if a state of "No detection of human body" continues for a fixed time period or longer, it may be determined that a human body is no longer detected and "No detection of human body" may be stored. The fixed time period may be set to a fixed value in advance, or may be changeable.

For example, if a state where a human body is detected (detection of human body) changes to a state where a human body is not detected (no detection of human body), and further, the state where a human body is not detected (no detection of human body) continues for a fixed time period or longer, the re-execution key 121 and the setting change key 122 are disabled, and the current setting is returned to the initial setting information 51.

The document presence-or-absence information 55 is information storing the presence or absence of a document detected by the document detector 21.

As shown in FIG. 2E, "Detection of document" or "No detection of document (No detected document)" is stored in the document presence-or-absence information 55.

As will be described later, after a selected function is executed by the function executer 28, and the key activation setter 24 enables an input operation with the setting change key 122 of the re-operation instruction keys, for a fixed time period, if the document detector 21 detects that the document is changed, an input operation with the re-execution key 121 is enabled, and an input operation with the setting change key 122 is disabled.

A state where the document is changed is detected if, for example, the document presence-or-absence information 55 changes from "Detection of document" to "No detection of document (No detected document)" within a fixed period, and further changes to "Detection of document".

That is, if it is detected, based on the change in the document presence-or-absence information 55, that a document placed on the document platen is changed (replaced by another document), the input with the re-execution key 121 is enabled, and the display area 131 corresponding to the re-execution key 121 is displayed on the display screen so that it is possible to perform re-execution with the setting items stored in the immediately preceding setting information 52.

The selected function information 56 is information storing a function selected and input by and with the function selection keys 110.

As shown in FIG. 2F, the selected function information 56 stores, for example, a copy function, a FAX function, a scan and save function, and a scan and transmission function.

The current setting of the setting items used in the selected function is displayed on the display screen, based on the selected function information 56. If an input operation with the function start key (the execution key) 115 is performed, the function stored in the selected function information 56 is executed based on the current setting of the setting items.

The current setting information 57 is the current setting contents (setting values) of the setting items used in the selected function, and if the selected function is to be executed, the contents (setting values) set to and stored in the current setting information 57 (current setting) are used to execute the function.

The current setting information 57 (current setting) is information temporarily stored, and the initial setting information 51 stored in advance, or the immediately preceding setting information 52 is set to (set to and stored in) the current setting information 57.

If a function is executed by using the initial setting information 51, the initial setting information 51 is set to (set to and stored in) the current setting information 57.

If a function is executed by using the immediately preceding setting information 52, the immediately preceding setting information 52 is set to (set to and stored in) the current setting information 57.

If the setting items used when a predetermined function is executed are changed, the contents of the current setting information 57 change temporarily. After the selected function is executed, in principle, the current setting information 57 during the execution of the function is stored in the immediately preceding setting information 52.

In addition, if, within a time period during which an input operation with the re-operation instruction keys including the re-execution key and the setting change key is enabled, an input operation with the re-operation instruction keys is not performed, then after the time period during which an input operation with the re-operation instruction keys is enabled elapses, the current setting information 57 change to be set to the initial setting information 51.

Description of Information Displayed on Operation Panel

FIGS. 3A and 3B are explanatory diagrams of an example of a display screen of initial setting information displayed on the display.

On an operation panel 100, as described above, the display 13 and some keys corresponding to the operation device 12 are arranged.

Current setting values (current setting) of setting items of a selected function are displayed on the display screen 102 of the display 13. For example, if the initial setting information 51 is set to (set to and stored in) the current setting, the stored contents of the initial setting information 51 are displayed.

In FIGS. 3A and 3B, the function selection keys 110 including the scan key 111 and the copy key 112, and the function start key 115 are illustrated as keys with which an input operation can be performed.

FIG. 3A illustrates the display screen 102 including initial setting information in a scan and transmission mode. Here, if an input operation with the scan key 111 of the operation device 12 is performed, the display screen 102 including the initial setting information in the scan and transmission mode illustrated in FIG. 3A is displayed on the display 13.

FIG. 3B illustrates the display screen 102 including initial setting information in a copy mode. Here, if an input operation with the copy key 112 of the operation device 12 is performed, the display screen 102 including the initial setting information in the copy mode illustrated in FIG. 3B is displayed on the display 13.

FIGS. 4A and 4B are explanatory diagrams of an example of a display screen that displays the re-execution key and the setting change key.

FIG. 4A illustrates the display screen 102 displaying the display area 131 corresponding to the re-execution key 121 in the scan and transmission mode.

As illustrated in FIG. 4A, the display area 131 corresponding to the re-execution key 121 is displayed in an overlapping manner on the display screen 102 including the initial setting information of FIG. 3A, for example.

Alternatively, the display screen may be switched, and a display screen including only the display area 131 corresponding to the re-execution key 121 may be displayed.

As illustrated in FIG. 3A, the display area 131 corresponding to the re-execution key 121 is not displayed before the function is executed, but is displayed on the display screen after an input is entered with the function start key 115 and the execution of the selected function ends.

If, after the display of the display area 131 corresponding to the re-execution key 121, a time period stored in the key enabled time setting value 53 elapses, the display area 131 corresponding to the re-execution key 121 is deleted.

On the other hand, if, before the time period stored in the key enabled time setting value 53 elapses, a touch input operation is performed on the display area 131 corresponding to the re-execution key 121, the contents of the setting items stored in the immediately preceding setting information 52 are read, and based on the read contents of the setting items, the selected function is executed again.

FIG. 4B illustrates the display screen 102 displaying the display area 131 corresponding to the re-execution key 121 and the display area 132 corresponding to the setting change key 122 in the scan and transmission mode.

In FIG. 4B, "Change some settings" indicating that some of setting contents of the setting items in the scan and transmission mode can be changed is displayed in the display area 132.

The display areas (131, 132) may also be displayed in an overlapping manner on the display screen including the initial setting information of FIG. 3A, as illustrated in FIG. 4B, or a display screen including only the display areas (131, 132) may be displayed.

The display areas (131, 132) are also displayed on the display screen after an input is entered with the function start key 115 and the execution of the selected function ends.

If, after the display of the display areas (131, 132), a time period stored in the key enabled time setting value 53 elapses, the display areas (131, 132) are deleted.

In the state where the display area 131 corresponding to the re-execution key 121 and the display area 132 corresponding to the setting change key 122 are displayed, the user can select and input either re-execution or settings change.

Similarly to FIG. 4A, if, before the time period stored in the key enabled time setting value 53 elapses, a touch input operation is performed on the display area 131 corresponding to the re-execution key 121, the contents of the setting items stored in the immediately preceding setting information 52 are read, and the selected function is executed again based on the read contents of the setting items.

On the other hand, if, before the time period stored in the key enabled time setting value 53 elapses, a touch input operation is performed on the display area 132 corresponding to the setting change key 122, the contents of the setting items stored in the immediately preceding setting information 52 are read, and it is possible to display the read contents of the setting items and change the contents of the setting items.

Description of Example of Display Screen Changing with Input Operation

Example 1

Figure 5A:
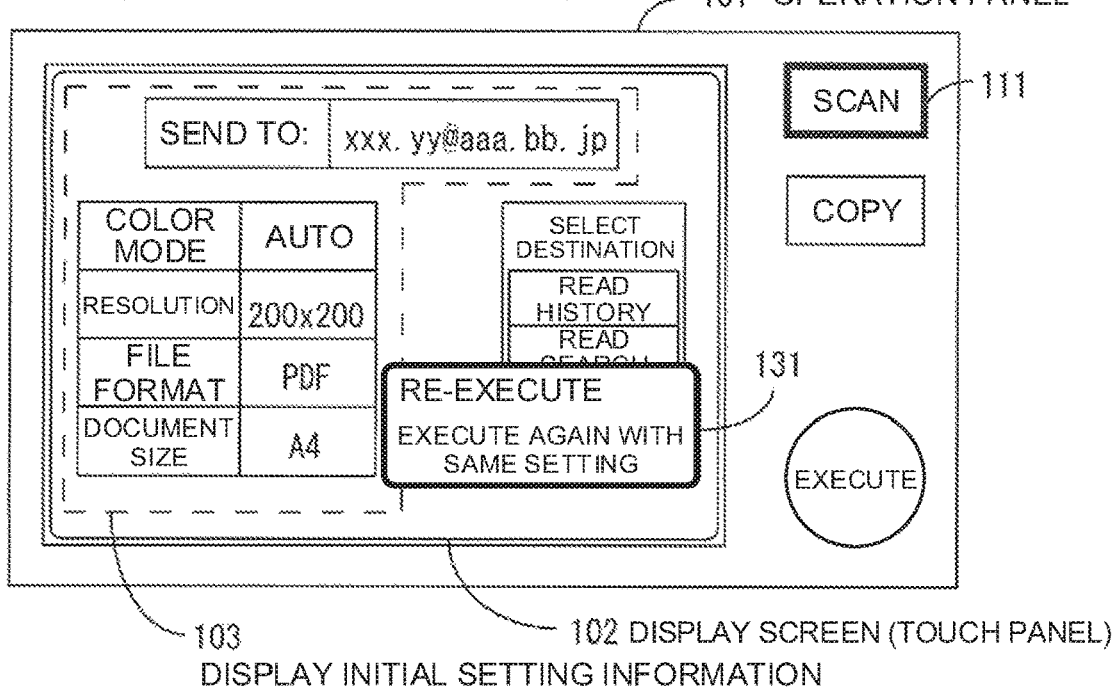
FIGS. 5A and 5B are explanatory diagrams of an example of a display screen displaying a re-execution key and a display screen after an input with the re-execution key.
Figure 5B:
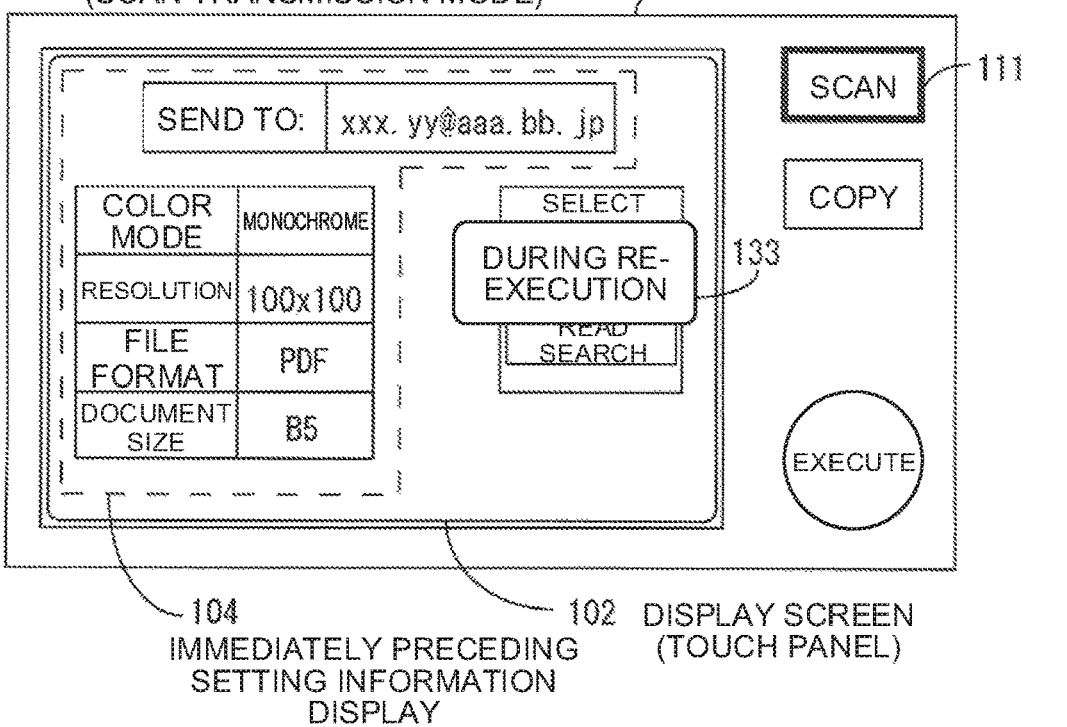

FIGS. 5A and 5B are explanatory diagrams of an example of a display screen that displays the re-execution key and a display screen after an input is entered with the re-execution key.

FIG. 5A is the same screen as that illustrated in FIG. 4A, and is the display screen 102 that displays the display area 131 corresponding to the re-execution key 121 in the scan and transmission mode.

It is assumed that the display screen 102 in this state provides initial setting information display 103 in the scan and transmission function.

It is assumed that the immediately preceding setting information 52 stores the contents of the setting items (the immediately preceding setting information in the scan and transmission mode in FIG. 2B) when the previous scan and transmission function was executed.

In the display state illustrated in FIG. 5A, it is assumed that a user either performs an input operation with the re-execution key 121 or performs a touch input operation on the display area 131 corresponding to the re-execution key 121.

At this time, an input operation with the re-execution key 121, or a touch input operation on the display area 131 corresponding to the re-execution key 121 is performed, and thus, first, the contents of the setting items stored in the immediately preceding setting information 52 are read, and as illustrated in FIG. 5B, the read contents of the setting items are displayed on the display screen 102. That is, the display on the display screen 102 switches from the initial setting information display 103 to a display 104 of the immediately preceding setting information 52.

Further, the selected function (the scan and transmission function) is executed again based on the read contents of the setting items. During this re-execution, for example, a display 133 indicating that currently re-execution is in progress is displayed in an overlapping manner on the display screen 102, as illustrated in FIG. 5B.

Thus, if the user performs an input operation with the re-execution key 121, or a touch input operation on the display area 131 corresponding to the re-execution key 121, thereafter, without performing a specific input operation, the contents of the setting items stored in the immediately preceding setting information 52 are read automatically, and the selected function (the scan and transmission function) is executed again based on the read contents of the setting items of the immediately preceding setting information 52.

In the case of the conventional information processing apparatus, after an input operation for reading the immediately preceding setting information 52 is performed, and the immediately preceding setting information 52 being the previous setting contents is displayed on the display, a user next performs an input operation for executing a selected function, and re-executes the selected function with the same setting contents as the last time.

However, in Example 1 according to the present invention, simply by performing an input operation with the re-execution key 121 (or performing a touch input operation on the display area 131 corresponding to the re-execution key 121), the user can re-execute the selected function with the same setting contents as those of the immediately preceding setting information 52 being the setting contents the last time. That is, it is possible to simplify the input operation for re-executing the selected function with the same setting contents as the last time, reduce the operation load on the user, and re-execute the selected function easily and quickly.

Example 2

Figure 6A:
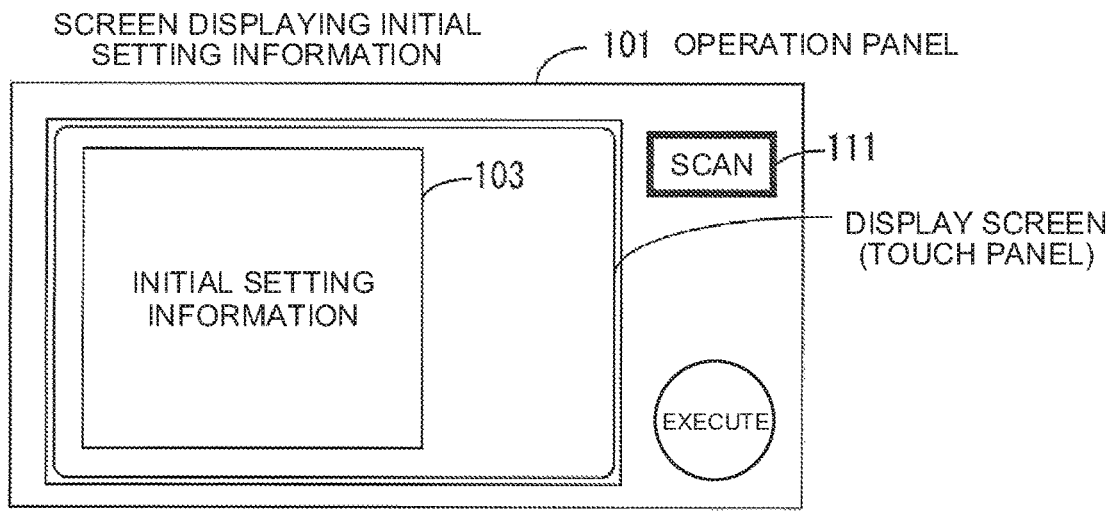
FIGS. 6A to 6C are explanatory diagrams of an example of a change in a display screen after an input with an execution key while initial setting information is displayed, until a re-execution key is displayed.
Figure 6B:
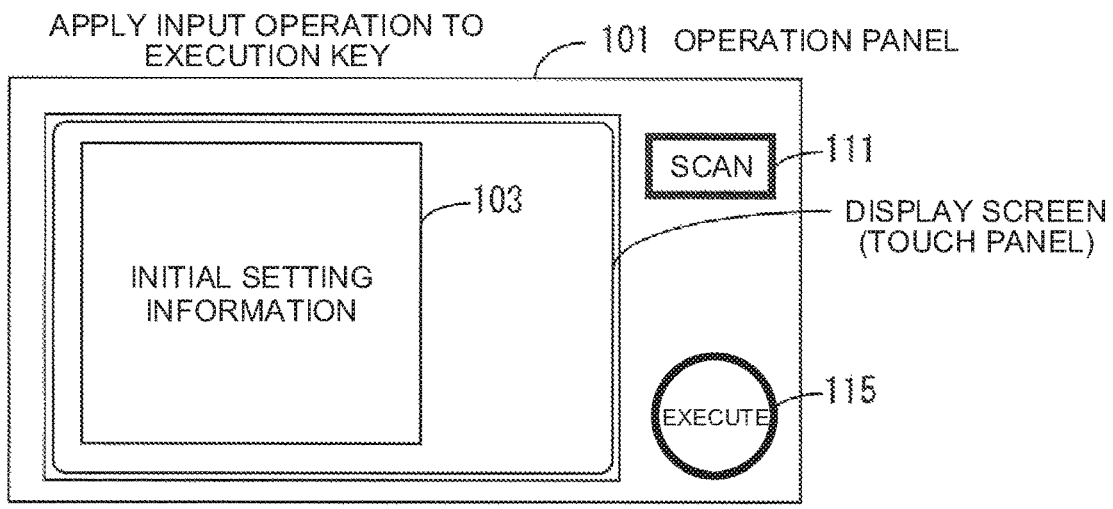
Figure 6C:
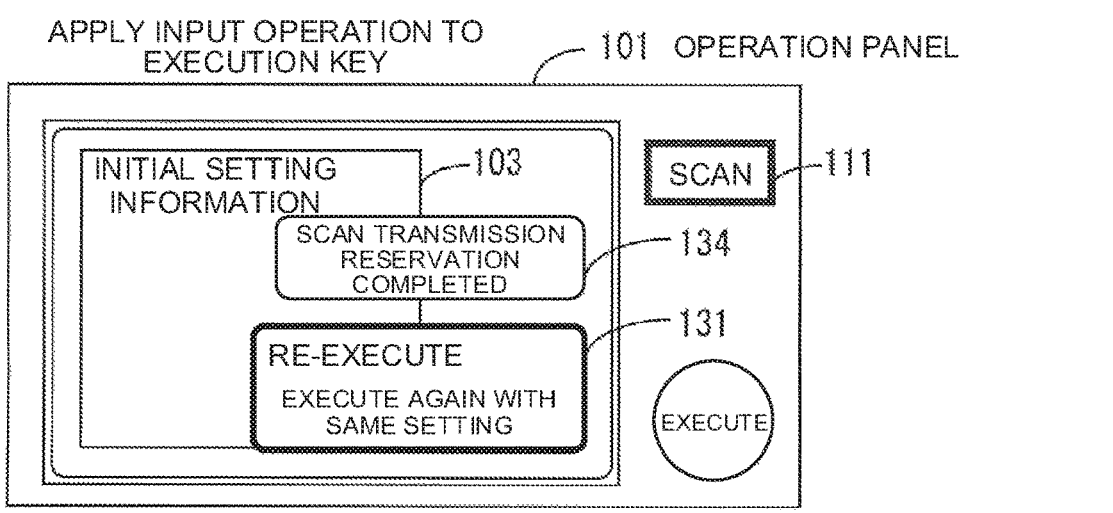

FIGS. 6A to 6C are explanatory diagrams of an example of a change in the display screen after an input with the execution key while initial setting information is displayed, until a re-execution key is displayed.

FIG. 6A illustrates a schematic view of a display screen displaying the initial setting information.

FIG. 6A corresponds to FIG. 3A and illustrates a case where a user selects the scan key 111 and enters an input with the scan key 111, and the initial setting information display 103 is provided on the display screen 102. The copy key and the like not related to the description are omitted. In the figures below, portions not related to the description are also omitted.

The user checks the initial setting information display 103 in FIG. 6A and determines whether to start the selected scan and transmission function, or change the contents of the setting items.

If the user determines that the scan and transmission function may be started with the contents of the setting items of the displayed initial setting information, the user performs an input operation with the execution key 115 as illustrated in FIG. 6B.

If an input is entered with the execution key 115, the execution of the currently selected scan and transmission function is started. For example, a document placed on the document platen is read, the image data of the document is acquired, and the acquired image data is transmitted to a preset destination.

In this case, the contents of the setting items of the initial setting information 51 are set to the current setting, and the document is read with the contents of the current setting.

After the execution of the scan and transmission function is complete, the contents of the current setting are stored in the immediately preceding setting information 52.

While the scan and transmission function is executed, a display such as "Scanning in progress" may be displayed on the display screen 102. If transmission takes some time, or if multiple documents are read and then transmitted collectively, a display 134 such as "Scan transmission reservation completed" illustrated in FIG. 6C may be provided to indicate that the preparation for transmission is complete.

After the execution of the scan and transmission function is complete, as illustrated in FIG. 6C, the display area 131 corresponding to the re-execution key 121 is displayed to overlap the initial setting information display 103.

Figure 8A:
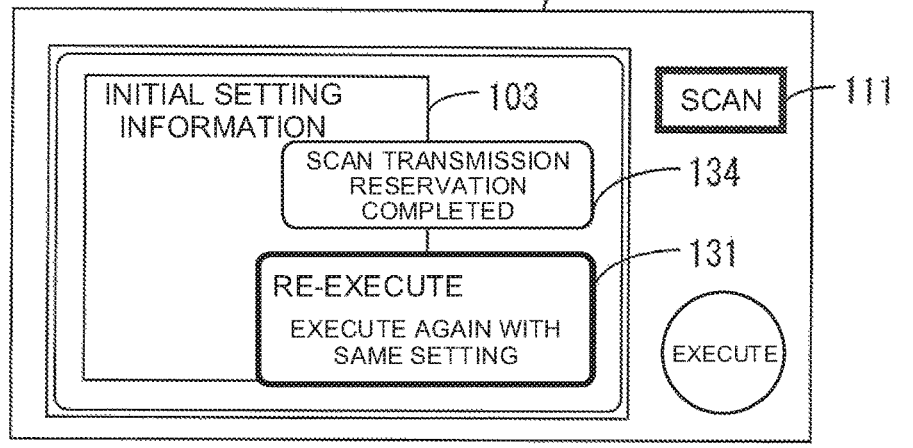
FIGS. 8A to 8C are explanatory diagrams of an example of a change in a display screen, when a scan function is re-executed after an input with a displayed re-execution key, until the re-execution key is displayed again.
Figure 8B:
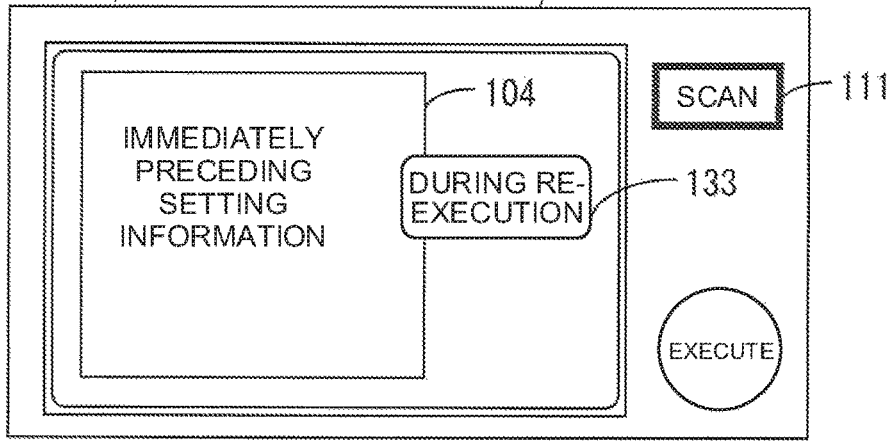
Figure 8C:
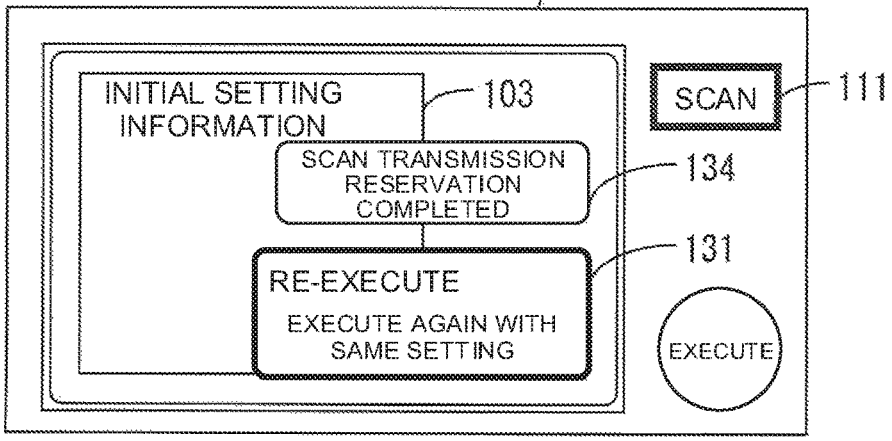

As illustrated in FIGS. 8A to 8C, which will be described later, if the scan and transmission function is executed again with the same setting contents thereafter, it is possible to simplify the input operation for re-execution only by performing a touch input operation on the display area 131 corresponding to the re-execution key 121, and the same selected function can be re-executed easily and quickly with the same setting contents.

It is considered that it is unlikely for the same function to be re-executed with the same setting items if a fixed time period (a time period set to the key enabled time setting value 53) elapses after the display area 131 corresponding to the re-execution key 121 is displayed. To prevent the same function from being executed with unintended contents of the setting items, the display in the display area 131 corresponding to the re-execution key 121 is deleted, and the display returns to the display screen illustrated in FIG. 6A. At this time, the contents of the initial setting information 51 are set to the current setting.

Example 3

Figure 7A:
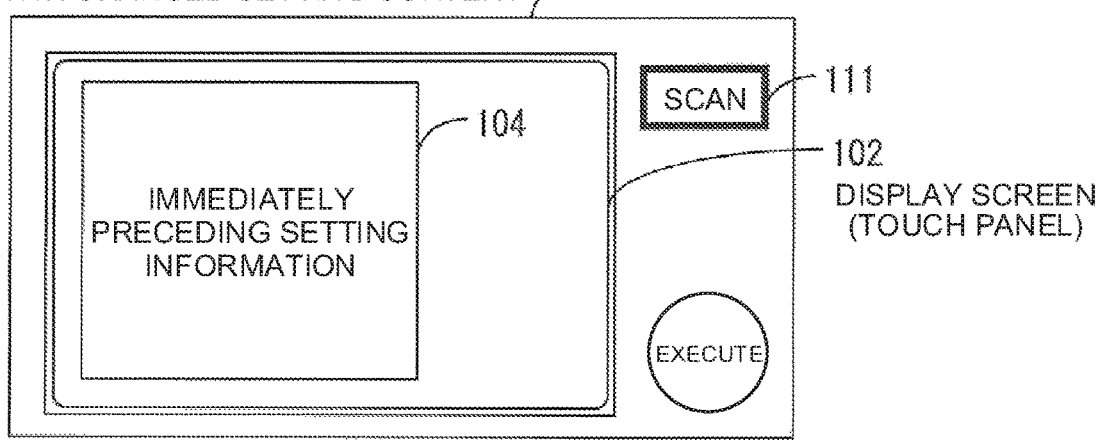
FIGS. 7A to 7C are explanatory diagrams of an example of a change in a display screen after an input with an execution key while immediately preceding setting information with setting contents changed is displayed, until a re-execution key is displayed.
Figure 7B:
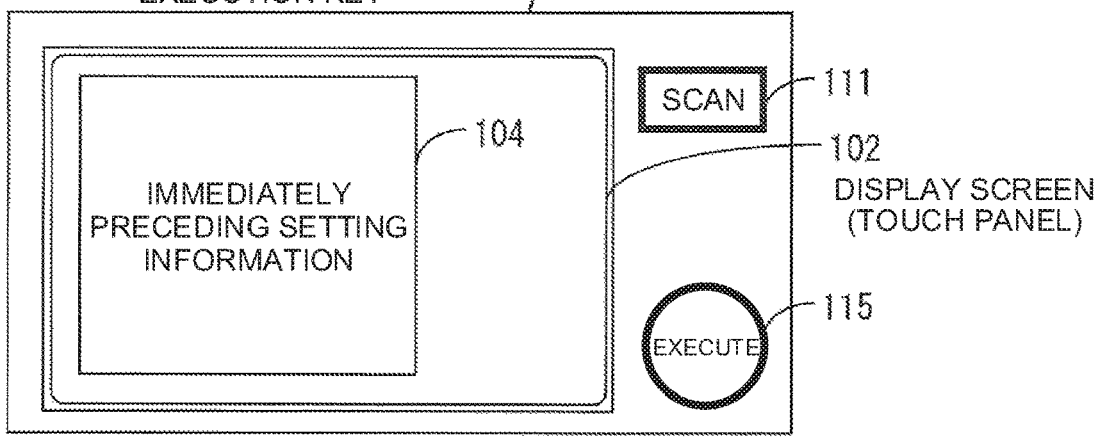
Figure 7C:
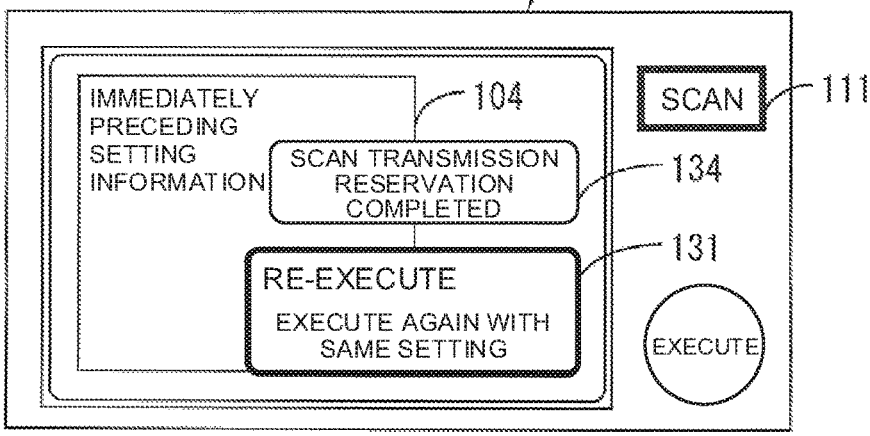

FIGS. 7A to 7C illustrate explanatory diagrams of an example of a change in the display screen after an input with the execution key while the immediately preceding setting information with setting contents changed is displayed, until the re-execution key is displayed.

FIGS. 6A to 6C illustrate an example in which the display area 131 corresponding to the re-execution key 121 is displayed after the function selected by using the initial setting information is executed. FIGS. 7A to 7C illustrate an example in which the display area 131 corresponding to the re-execution key 121 is displayed after the selected function is executed by using the immediately preceding setting information.

FIG. 7A illustrates a schematic view of a display screen on which, after the setting contents are changed, the immediately preceding setting information 52 storing the contents of the changed setting items is displayed.

Here, the display 104 in which the contents of the setting items of the immediately preceding setting information are omitted is illustrated, however, the immediately preceding setting information display 104 as illustrated in FIG. 5B is displayed on the display screen 102.

If a user determines that the scan and transmission function may be started with the contents of the setting items of the displayed immediately preceding setting information, the user performs an input operation with the execution key 115 as illustrated in FIG. 7B.

If an input is entered with the execution key 115, the execution of the currently selected scan and transmission function is started. For example, a document placed on the document platen is read, the image data of the document is acquired, and the acquired image data is transmitted to a preset destination.

In this case, the contents of the setting items of the immediately preceding setting information 52 are set to the current setting, and the document is read with the contents of the current setting.

After the execution of the scan and transmission function is complete, the contents of the current setting are stored in the immediately preceding setting information 52. In this case, the immediately preceding setting information 52 is not changed.

Thereafter, the display 134 such as "Scan and transmission reservation completed" illustrated in FIG. 7C may be provided to indicate that the preparation for transmission is complete, and after the execution of the scan and transmission function is complete, as illustrated in FIG. 7C, the display area 131 corresponding to the re-execution key 121 is displayed to overlap the immediately preceding setting information display 104.

In the case of the present example, if the scan and transmission function is to be executed again with the same setting contents, it is also only necessary to perform a touch input operation on the display area 131 corresponding to the re-execution key 121 to enable simplification of the input operation for re-execution, and it is possible to easily and quickly re-execute the same selected function with the same setting contents.

Example 4

FIGS. 8A to 8C illustrate explanatory diagrams of an example of a change in the display screen, when the scan function is re-executed after an input is entered with the displayed re-execution key, until the re-execution key is displayed again.

FIG. 8A is the same as FIG. 6C, and illustrates a state in which after the execution of the scan and transmission function is complete, and the display area 131 corresponding to the re-execution key 121 is displayed to overlap the initial setting information display 103.

In this state, it is assumed that a user performs a touch input operation on the display area 131 corresponding to the re-execution key 121. Alternatively, a user may perform an input operation with the re-execution key 121.

The touch input operation on the display area 131 or the input operation with the re-execution key 121 means that the same function is executed with the same contents as the contents of the setting items used in the function executed immediately before.

Therefore, the immediately preceding setting information 52 is read, the contents of the setting items stored in the immediately preceding setting information 52 are set to the current setting, and the scan and transmission function being the function executed immediately before is re-executed based on the contents of the current setting.

As illustrated in FIG. 8B, while the scan and transmission function is re-executed, the read immediately preceding setting information display 104 is provided, and the display 133 indicating "Re-execution in progress" may be provided to notify a user that re-execution is in progress.

FIG. 8C illustrates an example of a display screen after the re-execution of the scan and transmission function is complete.

Here, since the re-execution of the scan and transmission function is complete, similarly to FIG. 6C, the display 134 such as "Scan and transmission reservation completed" is displayed, and the display area 131 corresponding to the re-execution key 121 is displayed. The immediately preceding setting information display 104 returns to the initial setting information display 103. However, if the same scan and transmission function is re-executed again, the function is re-executed by using the immediately preceding setting information 52, and therefore, the display does not return to the initial setting information display 103, and the immediately preceding setting information display 104 may remain as is.

As described above, if the scan and transmission function is to be executed again with the same setting contents, it is only necessary to perform a touch input operation on the display area 131 corresponding to the re-execution key 121 to simplify the input operation for re-execution, and it is possible to easily and quickly re-execute the same selected function with the same setting contents.

Example 5

FIGS. 9A to 9C illustrate explanatory diagrams of an example of a change in the display screen, when the immediately preceding setting information is displayed after an input is entered with the displayed setting change key, until the scan function is re-executed with the changed immediately preceding setting information.

FIG. 8A described above illustrates a state in which after the execution of the scan and transmission function is complete, the display area 131 corresponding to the re-execution key 121 is displayed to overlap the initial setting information display 103.

However, in some cases, the user may desire to change some of the setting contents among the setting items stored in the immediately preceding setting information to re-execute the same function.

For example, in a case where the scan function is used, the user executes the scan function with automatically setting the color mode the first time, but may desire to execute the scan function with setting the color mode to monochrome the second time. The user executes the scan function with setting the resolution to 200 dpi×200 dpi the first time, but may desire to execute the scan function with setting the resolution to 400 dpi×400 dpi the second time.

Alternatively, in a case where the copy function is used, the user executes the copy function with setting the magnification to 100% the first time, but may desire to execute the copy function with setting the magnification to 80% the second time. The user executes the copy function with setting the number of copies to one the first time, but may desire to execute the copy function with setting the number of copies to five the second time. In such cases, before the same function is re-executed, it is necessary to change only some of the setting items. Alternatively, if necessary, the contents of all setting items may be changed.

Therefore, in addition to the display area 131 corresponding to the re-execution key 121, the display area 132 corresponding to the setting change key 122 may also be displayed.

FIG. 9A illustrates a state in which after the execution of the scan and transmission function is complete, the display area 131 corresponding to the re-execution key 121, and the display area 132 corresponding to the setting change key 122 are displayed to overlap the initial setting information display 103. In FIG. 9A, characters indicating "Change some settings" are displayed in the display area 132 corresponding to the setting change key 122, but the display is not limited to this character display.

In the display state illustrated in FIG. 9A, the user can select either of the two display areas (131, 132) for entering an input.

If the same function is to be executed with the same contents as the immediately preceding setting contents, the user may select the display area 131 corresponding to the re-execution key 121 for entering an input. Alternatively, an input may be entered with the re-execution key 121.

On the other hand, if the same function is to be executed with contents different from the immediately preceding setting contents, the user may select the display area 132 corresponding to the setting change key 122 for entering an input. Alternatively, an input may be entered with the setting change key 122.

FIG. 9B illustrates an example of the display screen after the user selects the display area 132 corresponding to the setting change key 122 or the setting change key 122 for entering an input.

Here, the immediately preceding setting information 52 used in the scan and transmission function executed immediately before is read, the immediately preceding setting information display 104 is provided, and "Setting changeable" indicating that the contents of the setting items of the immediately preceding setting information are changeable is displayed. Thereafter, it is possible to enter an input to change the setting items.

The user may enter an input to select the setting item to be changed, and for example, the user may select a desired content on the selection screen of the contents of the setting items displayed thereafter. If this input operation is performed, the contents of some or all of the setting items of the immediately preceding setting information 52 are updated to the changed information. After the operation of changing the contents of the desired setting items ends, if the display returns to the immediately preceding setting information display 104 of FIG. 9B, the displayed contents of the immediately preceding setting information 52 change to the changed contents.

If, after the contents of the immediately preceding setting information 52 are changed, the user desires to execute the same function with the changed contents of the setting items, the user may perform an input operation with the execution key 115.

FIG. 9C illustrates an example of the display screen when the input operation with the execution key 115 is performed after the contents of the immediately preceding setting information 52 are changed.

Here, to inform the user that the scan and transmission function is executed with the changed contents of the setting items, a display 135 indicating "Scanning in progress" indicating that the scan and transmission function is executed is provided, for example, to overlap the immediately preceding setting information display 104.

If the execution of the scan and transmission function is complete, for example, as illustrated in FIG. 9A, the display may return to the display screen displaying the two display areas (131, 132).

Example 6

Figure 10A:
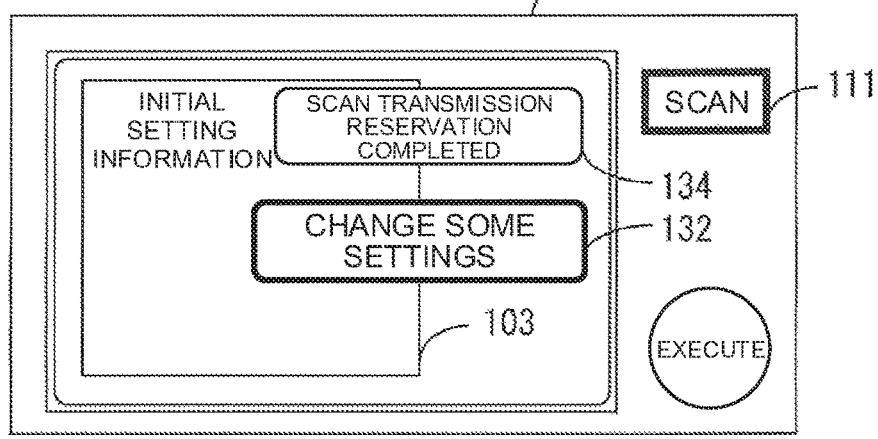
FIGS. 10A to 10C are explanatory diagrams of an example of a change in a display screen if, after the execution of a scan function is complete, it is detected that a placed document is changed while a setting change key is displayed, until the scan function is re-executed with the immediately preceding setting information after a re-execution key is displayed and an input is entered with the re-execution key.
Figure 10B:
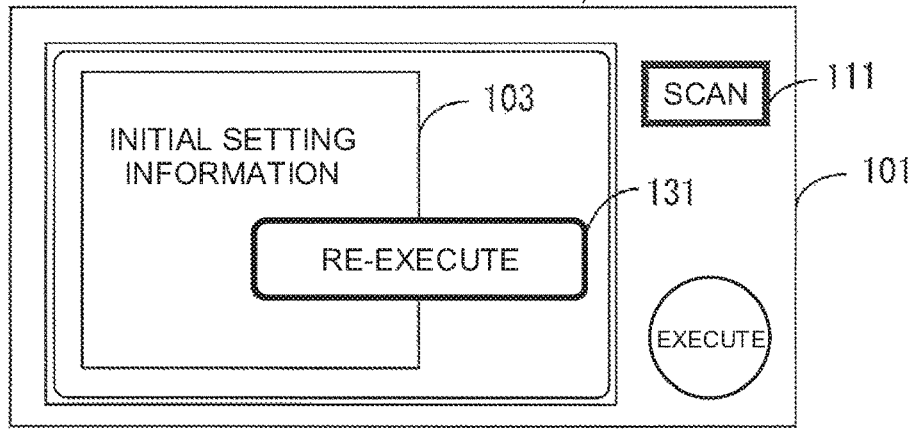
Figure 10C:
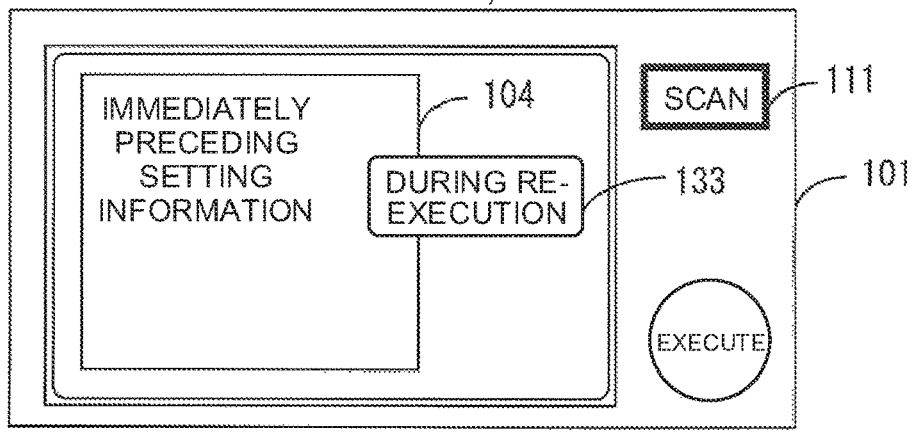

FIGS. 10A to 10C illustrate explanatory diagrams of an example of a change in the display screen when after the execution of the scan function is complete, it is detected that a placed document is changed while the setting change key is displayed, until the scan function is re-executed with the immediately preceding setting information after the re-execution key is displayed and the user enters an input with the re-execution key.

FIG. 9A described above illustrates a state in which after the execution of the scan and transmission function is complete, the display area 131 corresponding to the re-execution key 121, and the display area 132 corresponding to the setting change key 122 are displayed to overlap the initial setting information display 103.

However, after the execution of the scan and transmission function is complete, only the display area 132 corresponding to the setting change key 122 may be displayed.

FIG. 10A illustrates a state in which after the execution of the scan and transmission function is complete, the display area 132 corresponding to the setting change key 122 is displayed to overlap the initial setting information display 103, without displaying the display area 131 corresponding to the re-execution key 121.

At this time, if a touch input operation is performed on the display area 132 corresponding to the setting change key 122, a screen such as that illustrated in the above-described FIG. 9B is displayed, and the immediately preceding setting information is changeable.

Usually, immediately after the execution of the scan and transmission function is complete, it is highly possible that the scanned document is still placed on the document platen. If the same function is re-executed for a scanned document, the possibility of re-executing the same function after some of the immediately preceding setting contents are changed may be higher than the possibility that the same function will be executed again with the same setting contents.

A case where the same function is re-executed with the same setting contents may include a case where a scanned document A is removed, and another document B is placed on the document platen, following which the function is executed for the other document B.

Therefore, if, immediately after the execution of the scan and transmission function is complete, the scanned document is not removed, the display area 132 corresponding to the setting change key 122 is displayed to change some of the setting contents of the setting items used in the immediately preceding scan and transmission function, as illustrated in FIG. 10A.

Thus, the display area 132 is displayed, and the user is able to easily change some of the setting contents of the setting items by performing a touch input operation on the display area 132. Further, the user can change some of the setting contents of the setting items to re-execute the same function for the scanned document.

On the other hand, after the execution of the scan and transmission function is complete, if the user re-executes the same function with the same setting contents for a document different from the scanned document, the user performs a work of changing the document while the display screen illustrated in FIG. 10A is displayed.

That is, after the operation of removing the scanned document A from the document platen is performed, the user performs an operation of placing another document B on the document platen.

At this time, before the scanned document A is removed from the document platen, the document detector 21 detects a state of "Detection of document", but within a fixed time period, the document detector 21 detects a state of "No detected document" due to removal of the scanned document A, and then a state of "Detection of document" due to placement of another document B on the document platen. Thus, if the document detector 21 confirms that the state changes from "Detection of document" to "No detected document", and then again changes to "Detection of document", it is assumed that the document is changed.

Therefore, after the document detector 21 detects a change in the presence or absence of the document as described above, the display screen switches from that in FIG. 10A to that in FIG. 10B.

In FIG. 10B, the display area 131 corresponding to the re-execution key 121 is displayed.

Thereafter, by performing a touch input operation on the display area 131, it is possible to easily re-execute the same function as the function executed immediately before for another changed document with the same setting contents as the immediately preceding setting information.

FIG. 10C illustrates a display example of a state in which the scan and transmission function is re-executed if the user performs a touch input operation on the display area 131 corresponding to the re-execution key 121 in the display state of FIG. 10B.

if the user performs a touch input operation on the display area 131, the immediately preceding setting information 52 is read, the immediately preceding setting information 52 is set to the current setting, and the scan and transmission function is re-executed based on the current setting.

At this time, as illustrated in FIG. 10C, the immediately preceding setting information display 104 set to the current setting is provided on the display screen, and the display 133 indicating "Re-execution in progress" meaning that the scan and transmission function is re-executed is provided.

Example 7

Figure 11A:
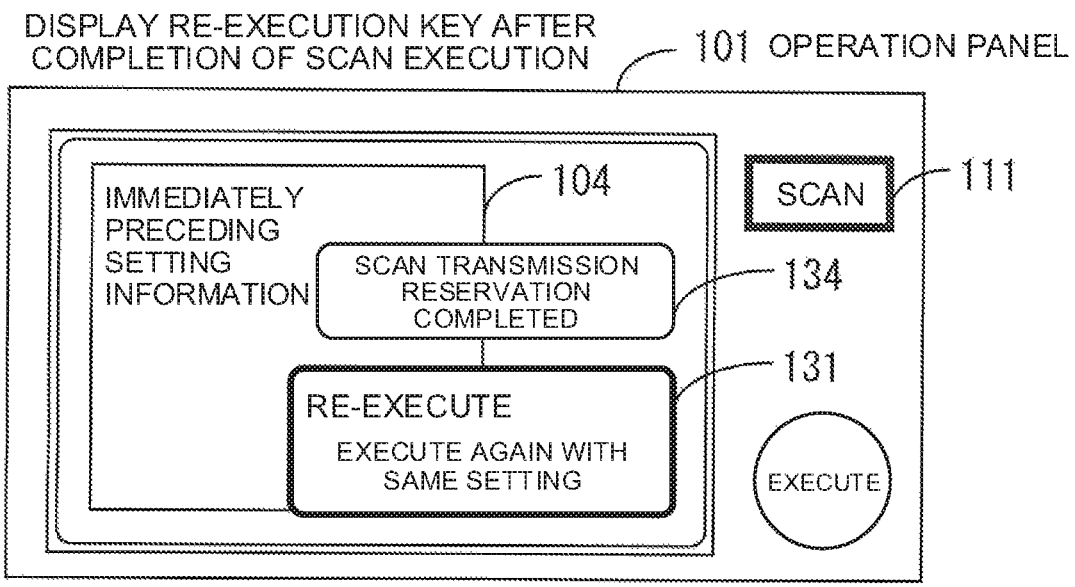
FIGS. 11A and 11B are explanatory diagrams of an example of a change in a display screen, if a key enabled time is elapsed, or if a motion sensor does not detect a human body after a re-execution key is displayed, until the initial setting information is displayed.
Figure 11B:
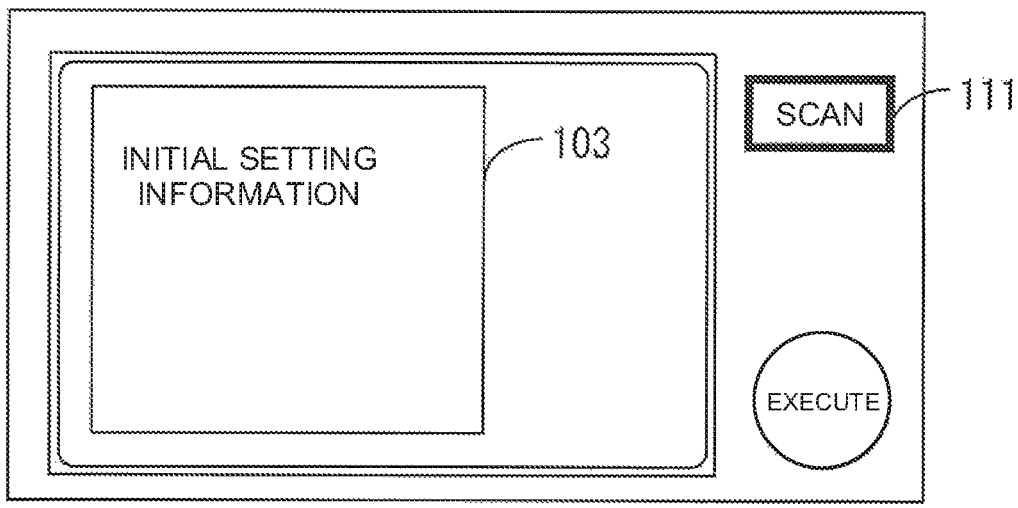

FIGS. 11A and 11B illustrate explanatory diagrams of an example of a change in the display screen, if a key enabled time has elapsed, or if the motion sensor does not detect a human body after the re-execution key is displayed, until the initial setting information is displayed.

FIG. 11A illustrates an example of a display screen on which the display area 131 corresponding to the re-execution key 121 is displayed to overlap the immediately preceding setting information display 104 after the execution of the scan and transmission function is complete.

The figure is the same display screen as in FIG. 7C.

After the display area 131 corresponding to the re-execution key 121 is displayed, the display timer is activated and the time period (for example, five seconds) stored in the key enabled time setting value 53 is measured.

The time period measured by the display timer is a time period during which the display area 131 corresponding to the re-execution key 121 is displayed, and is a time period during which the input operation with the re-execution key 121 is enabled.

After the display timer 131 times out and the time period stored in the key enabled time setting value elapses without a touch input operation on the display area 131 or a key input with the execution key and the like, as illustrated in FIG. 11B, the display of the display area 131 corresponding to the re-execution key 121 is deleted, and an input operation with the re-execution key 121 is disabled. Further, the current setting is returned to the initial setting information 51, and the initial setting information display 103 is provided on the display screen.

If a human body is not detected by the motion sensor, the display illustrated in FIG. 11B is also provided, the input operation with the re-execution key 121 is disabled, and the current setting is returned to the initial setting information 51.

Thus, if the fixed time period elapses without any input operation by the user, or if a human body is not detected in the vicinity of the information processing apparatus by the motion sensor, the current setting is returned to the initial setting information 51 so that a user using the information processing apparatus the next time can be prevented from executing a selected function with unintended setting contents other than the initial settings.

Example 8

FIGS. 12A and 12B illustrate explanatory diagrams of an example of an operation panel including operation keys for performing a re-execution and a setting change, and a display element LED indicating that the operation inputs with the operation keys is enabled.

Unlike the operation panel 101 illustrated in FIG. 3 and the like, FIGS. 12A and 12B illustrate the operation panel 101 provided with the re-execution key 121 and the setting change key 122.

If an input operation with the re-execution key 121 is performed, the same function is executed with the contents of the setting items stored in the immediately preceding setting information 52.

If an input operation with the setting change key 122 is performed, the setting items stored in the immediately preceding setting information 52 are changeable.

In addition, the operation panel 101 illustrated in FIG. 12A includes a display element LED 150 that indicates whether input operations with the re-execution key 121 and the setting change key 122 are enabled or disabled.

For example, if input operations with the re-execution key 121 and the setting change key 122 are enabled, the LED 150 is lit up or flashed. Alternatively, the LED 150 may be lit up in green.

When the LED 150 is lit up or flashed, and an input operation with either the re-execution key 121 or the setting change key 122 is performed, a process corresponding to the input operation is executed.

On the other hand, if input operations with the re-execution key 121 and the setting change key 122 are disabled, the LED 150 is turned off.

Alternatively, the LED 150 may be lit up in red.

When the LED 150 is turned off, even if an input operation with either the re-execution key 121 or the setting change key 122 is performed, a process corresponding to the input operation is not executed.

The display screen of FIG. 12A illustrates a screen displaying the same initial setting information as that in FIG. 3A, however, if input operations with the re-execution key 121 and the setting change key 122 are enabled, then similarly to the display screens in FIG. 4A and FIG. 4B, the display area 131 corresponding to the re-execution key 121 or the display area 132 corresponding to the setting change key may be displayed.

The operation panel 101 in FIG. 12B includes two display element LEDs, corresponding to each of the re-execution key 121 and the setting change key 122, that indicate whether the input operation with each of the keys is enabled or disabled.

An LED 1 (151) indicates whether an input operation with the re-execution key 121 is enabled or disabled, and an LED 2 (152) indicates whether an input operation with the setting change key 122 is enabled or disabled.

For example, when the LED 1 (151) lights up or flashes, an input operation with the re-execution key 121 is enabled, and if an input operation with the re-execution key 121 is performed, the re-execution process corresponding to the input operation is executed.

When the LED 1 (151) is turned off, an input operation with the re-execution key 121 is disabled, and even if an input operation with the re-execution key 121 is performed, the re-execution process is not executed.

When the LED 2 (152) lights up or flashes, an input operation with the setting change key 122 is enabled, and if an input operation with the setting change key 122 is performed, a process of changing the setting items corresponding to the input operation can be executed.

When the LED 2 (152) is turned off, an input operation with the setting change key 122 is disabled, and even if an input operation with the setting change key 122 is performed, a process of changing the setting items is not executed.

Thus, if the re-execution key 121 and the setting change key 122 are provided, a time zone for enabling input operations with the keys is set, and display element LEDs are provided to indicate whether input operations with the keys are enabled or disabled, the user can be easily informed of a state where a re-execution or a setting change is enabled to properly perform an input operation for a re-execution, or the like.

Flowchart for Re-Executing Scan Process Performed Immediately Before

Hereinafter, an embodiment of a flowchart in a case where the same process as a scan process performed immediately before is re-executed with the same setting contents, and a case where the process is re-executed with different setting contents will be described.

A control process described below describes a process performed when the scan function (scan mode) is selected, but the selected function is not limited to the scan function, and a similar control process is executed even if another function such as the copy function is selected.

Flowchart of First Embodiment

Here, mainly, a process will be described in which after a scan function is executed immediately before, input operations with the re-execution key 121 and the setting change key 122 are set to be enabled, the display areas (131, 132) respectively corresponding to the re-execution key 121 and the setting change key 122 are displayed for a fixed time period, and after the fixed time period elapses, or if a human body no longer is detected by the motion sensor, input operations with the re-execution key 121 and the setting change key 122 are set to be disabled, the display areas (131, 132) are deleted, and the current setting is returned to the initial setting information.

Figure 13:
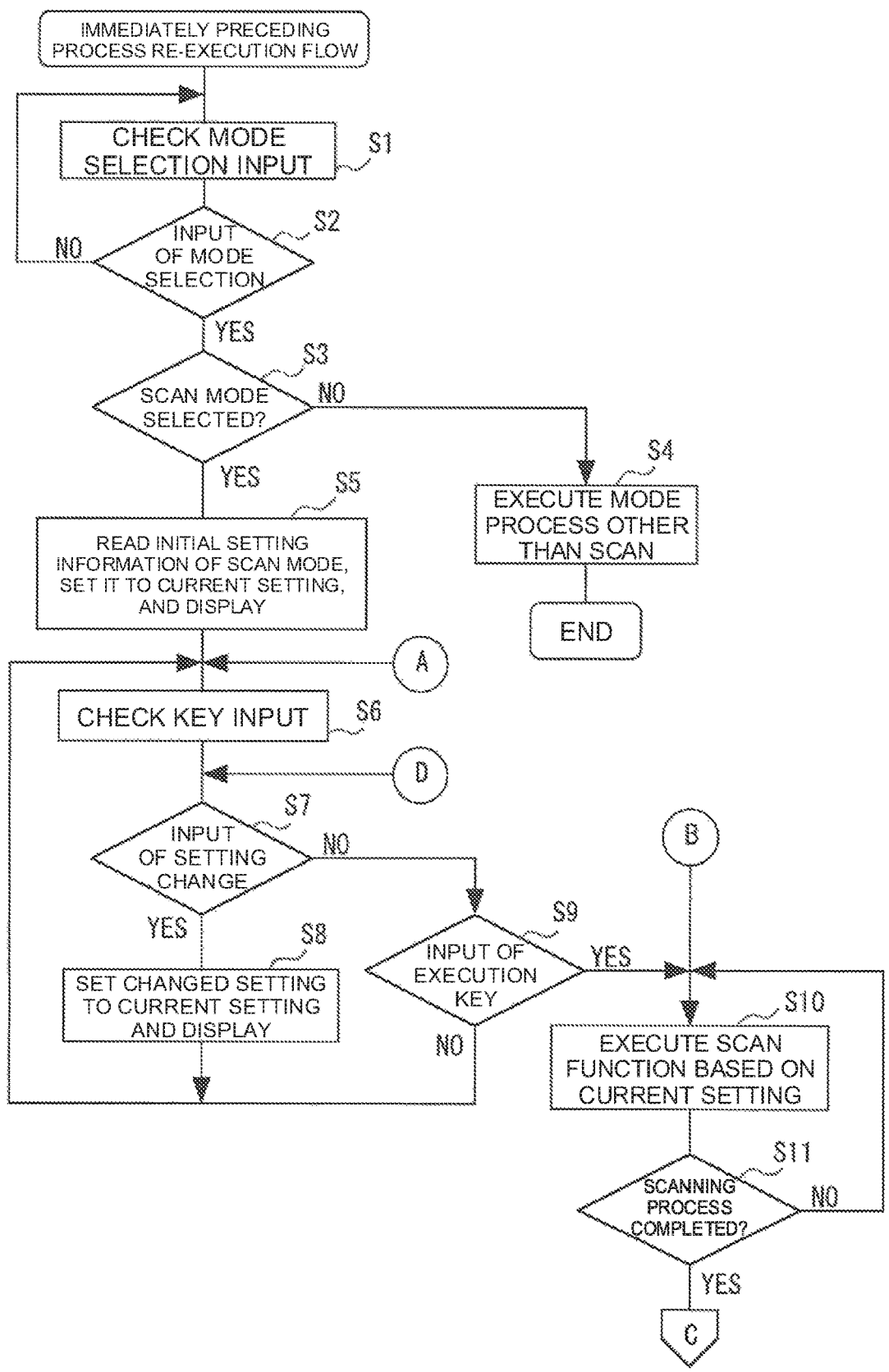
FIG. 13 is a flowchart of an example of a control process performed when a scan process performed immediately before is re-executed in the present invention.

FIG. 13 illustrates a flowchart of an example of a control process performed when a scan process performed immediately before is re-executed.

Figure 14:
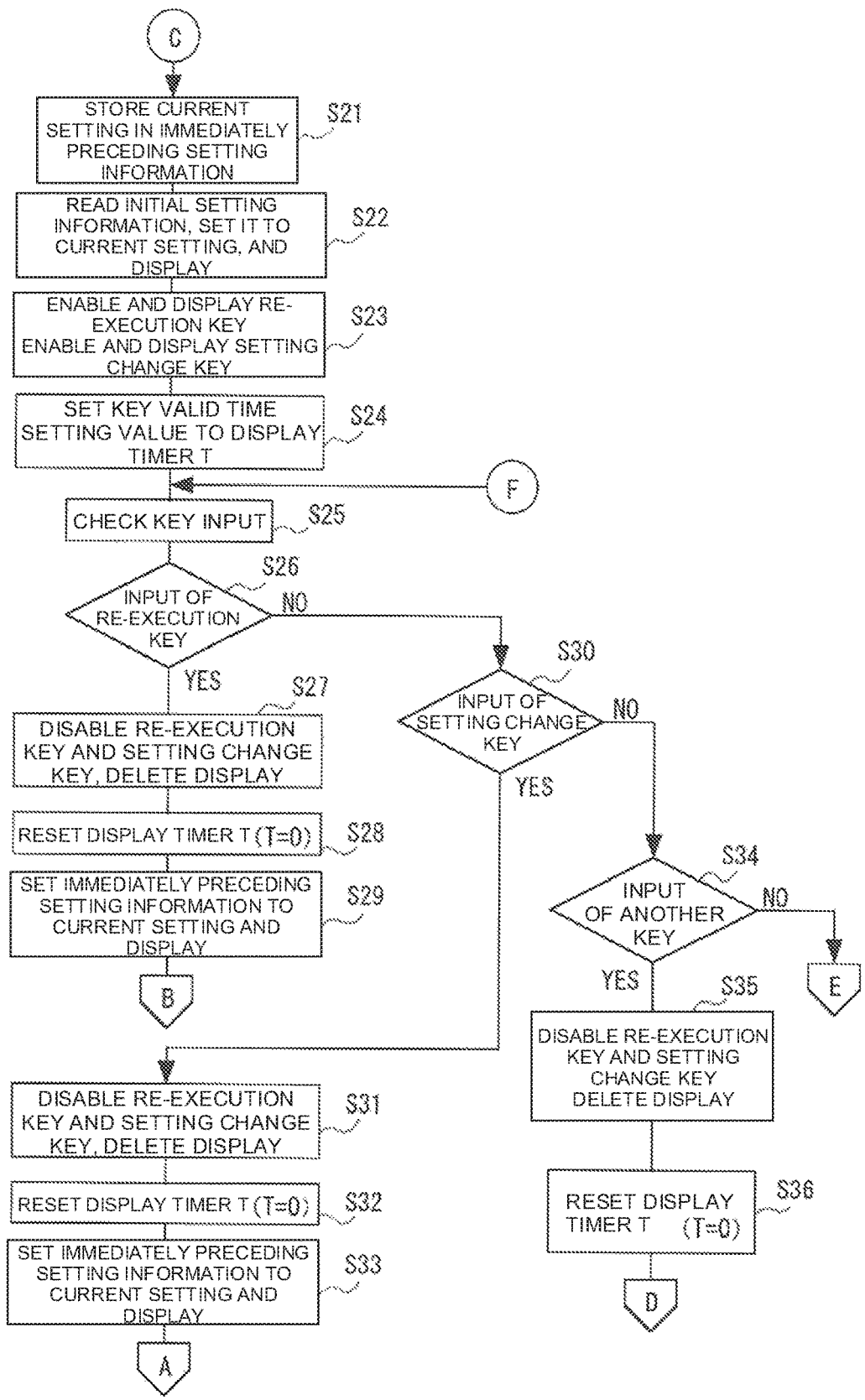
FIG. 14 is a flowchart, in continuation to FIG. 13, of an example of a control process performed when a scan process performed immediately before is re-executed in the present invention.

FIG. 14 illustrates a flowchart of an example, in continuation to FIG. 13, of a control process performed when a scan process performed immediately before is re-executed.

Figure 15:
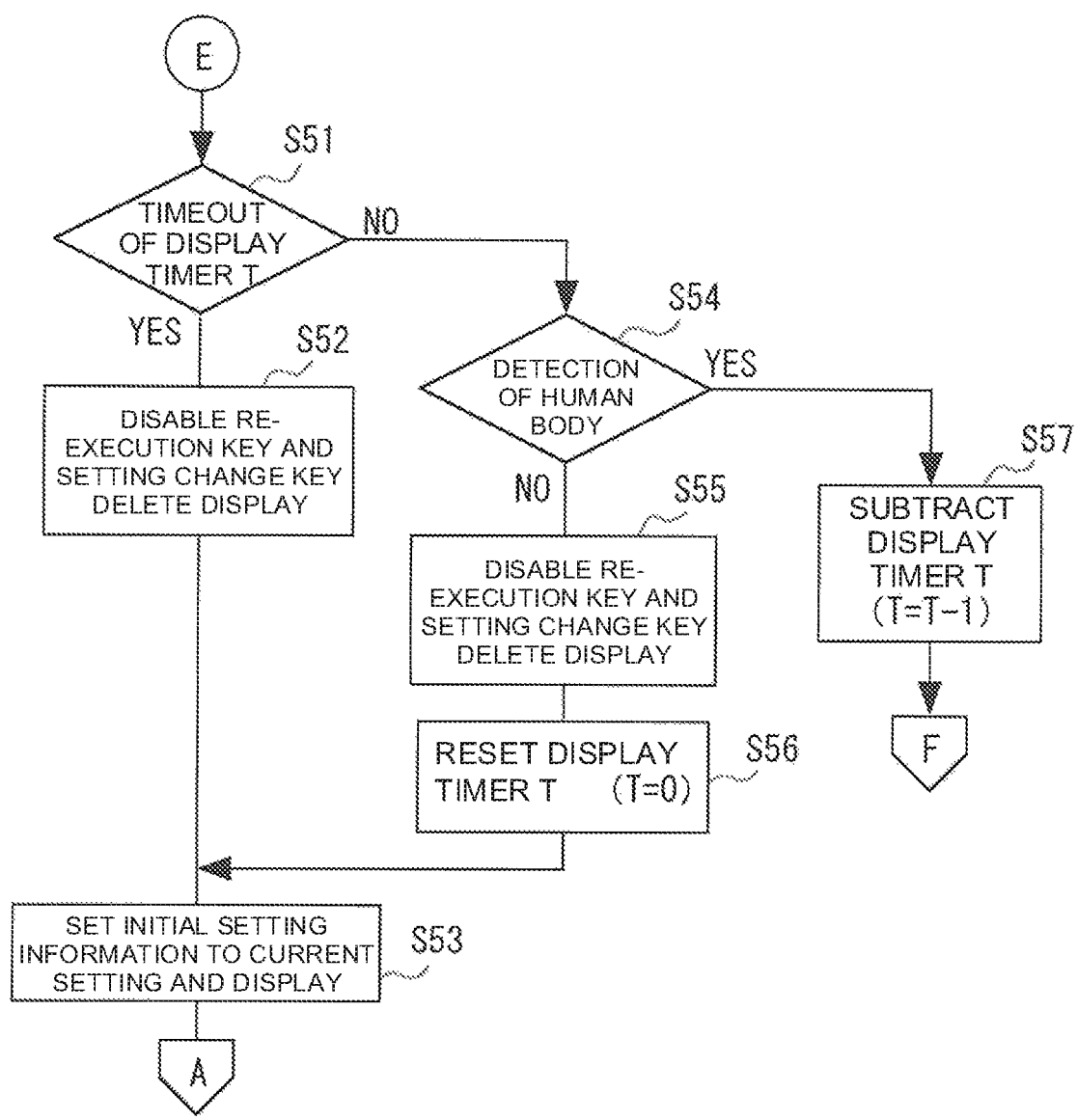
FIG. 15 is a flowchart, in continuation to FIG. 14, of an example of a control process performed when a scan process performed immediately before is re-executed in the present invention.

FIG. 15 illustrates a flowchart of an example, in continuation to FIG. 14, of a control process performed when a scan process performed immediately before is re-executed.

In step S1 of FIG. 13, the controller 11 checks whether a mode selection input is performed. Here, for example, it is checked whether an input operation with any one of the function selection keys 110 is performed.

In step S2, if the mode selection input is performed, the processing proceeds to step S3, and otherwise returns to step S1.

In step S3, if an input is entered with the scan key 111 indicating the scan mode, and the scan mode is selected, the processing proceeds to step S5, and otherwise proceeds to step S4.

In step S4, a mode other than the scan function is selected, and therefore, a process corresponding to the selected mode is executed. For example, if an input is entered with the copy key 112, a process in the copy mode is executed.

Thereafter, the processing ends or the processing returns to step S1.

In step S5, the initial setting reader 25 reads the initial setting information 51 of the scan function (scan mode) stored in the storage 50 and sets the contents of the setting items of the initial setting information 51 to the current setting. The contents of the setting items of the initial setting information 51 set to the current setting are displayed on the display screen 102.

In step S6, the key input confirmer 23 checks whether an input operation with a predetermined key is performed.

In step S7, if an input indicating a change in the setting items displayed on the display screen 102 is performed, the processing proceeds to step S8, and otherwise proceeds to step S9.

If the user looks at the contents of the current setting displayed on the display screen 102, and desires to change the current setting contents of a desired setting item, the user performs a predetermined input operation to change the setting contents of the setting item.

In step S8, the setting content of the setting item changed by the user is set to the current setting. The setting contents of the current setting are updated. The updated current setting is displayed on the display screen 102. After step S8, the processing returns to step S6.

In step S9, if an input is entered with the execution key 115 on the operation panel, the processing proceeds to step S10, and otherwise returns to step S6.

In step S10, an input is entered with the execution key 115, and thus, the function executer 28 executes the scan function based on the setting contents of the setting items set to the current setting.

For example, a document placed on the document platen is read, and the image data of the read document is saved in a predetermined storage medium such as a USB memory. Alternatively, the image data of the read document is sent to a predetermined destination.

In step S11, if a series of processes of the scan function are ended, the processing proceeds to step S21 in FIG. 14, and otherwise returns to step S10.

In step S21 of FIG. 14, the setting contents of the current setting are stored in the immediately preceding setting information 52.

In step S22, the initial setting reader 25 reads the initial setting information 51 and sets the setting contents of the initial setting information 51 to the current setting. The setting contents of the current setting are displayed on the display screen 102. As a result, the setting contents of the current setting items are returned to the initial setting information 51, and the setting contents stored in the initial setting information 51 are displayed.

However, if the display timer described later times out, the current setting is returned to the initial setting information 51, and therefore, the process of returning the current setting to the initial setting information 51 in step S22 need not be performed.

In step S23, the key activation setter 24 sets input operations with the re-execution key 121 and the setting change key 122 to be enabled, and the display area 131 corresponding to the re-execution key 121 and the display area 132 corresponding to the setting change key 122 are displayed on the display screen 102.

Here, as illustrated in FIG. 4B, two display areas (131, 132) are displayed.

If the LEDs (150 to 152) are provided, the LEDs are lit up to indicate that input operations with the re-execution key 121 and the setting change key 122 are enabled.

In step S24, the key activation setter 24 sets a time period stored in the key enabled time setting value 53 to a display timer T, and activates the display timer T. As a result, a period during which the two display areas (131, 132) are displayed, and a period during which input operation with the re-execution key 121 and the setting change key 122 are enabled are set.

In step S25, as in step S6, the key input confirmer 23 checks whether an input operation with a predetermined key is performed.

In step S26, if an input is entered with the re-execution key 121 or on the display area 131 corresponding to the re-execution key 121, the processing proceeds to step S27, and otherwise proceeds to step S30.

In step S27, the display area 131 corresponding to the re-execution key 121 and the display area 132 corresponding to the setting change key 122 are deleted from the display screen 102.
Input operations with the re-execution key 121 and the setting change key 122 are set to be disabled, and the LEDs lit up in step S23 are turned off.

In step S28, the display timer T is reset (T is set to 0).

In step S29, the immediately preceding setting reader 26 reads the immediately preceding setting information 52 and sets the setting contents of the immediately preceding setting information 52 to the current setting. The setting contents of the current setting are displayed on the display screen 102.

As a result, the setting contents of the current setting items are reset to the current setting during the execution of the scan function in the immediately preceding step S10, the setting contents stored in the immediately preceding setting information 52 are displayed, and preparations are made to enable the execution of the same function as that executed in the immediately preceding step S10 with the same setting contents.

Thereafter, the processing returns to step S10 of FIG. 13, and the same function is re-executed with the same setting contents.

In step S30, if an input is entered with the setting change key 122 or on the display area 132 corresponding to the setting change key 122 is entered, the processing proceeds to step S31, and otherwise proceeds to step S34.

In step S31, as in step S27, the display area 131 corresponding to the re-execution key 121 and the display area 132 corresponding to the setting change key 122 are deleted from the display screen 102.

Input operations with the re-execution key 121 and the setting change key 122 are set to be disabled, and the LEDs lit up are turned off.

In step S32, as in step S28, the display timer T is reset (T is set to 0).

In step S33, as in step S29, the immediately preceding setting reader 26 reads the immediately preceding setting information 52 and sets the setting contents of the immediately preceding setting information 52 to the current setting. The setting contents of the current setting are displayed on the display screen 102.

As a result, the setting contents of the current setting items are reset to the current setting during the execution in the immediately preceding step S10, and preparations are made to enable a change in the setting contents stored in the immediately preceding setting information 52.

Thereafter, the processing returns to step S6 of FIG. 13, and the user changes the setting contents of the desired setting item.

If an input is entered with another key in step S34, the processing proceeds to step S35, and otherwise proceeds to step S51 of FIG. 15.

In step S35, as in step S27, the display area 131 corresponding to the re-execution key 121 and the display area 132 corresponding to the setting change key 122 are deleted from the display screen 102. Input operations with the re-execution key 121 and the setting change key 122 are set to be disabled, and the LEDs lit up are turned off.

In step S36, as in step S28, the display timer T is reset (T is set to 0).

Thereafter, the processing returns to step S7 of FIG. 13. Alternatively, the process associated with the other key with which an input is entered may be executed, and the processing may return to step S6.

In step S51 of FIG. 15, it is checked whether the display timer T times out (for example, if T=0), and if the display timer T times out, the processing proceeds to step S52, and otherwise proceeds to step S54.

In step S52, as in step S27, the display area 131 corresponding to the re-execution key 121 and the display area 132 corresponding to the setting change key 122 are deleted from the display screen 102. Input operations with the re-execution key 121 and the setting change key 122 are set to be disabled, and the LEDs lit up are turned off.

In this case, after the display area 131 corresponding to the re-execution key 121 is displayed, no input operation is performed even after a fixed time period or longer elapses, and therefore, the setting contents of the current setting items are returned to the initial values.

In step S53, as in step S22, the initial setting reader 25 reads the initial setting information 51 and sets the setting contents of the initial setting information 51 to the current setting. The setting contents of the current setting are displayed on the display screen 102.

As a result, the setting contents of the current setting items are returned to the initial setting information 51, and the setting contents stored in the initial setting information 51 are displayed.

In addition, the setting contents of the current setting items are returned to the initial setting information 51, and therefore, if another user uses the information processing apparatus, it is possible to reduce the possibility of execution of a selected function with unintended setting contents.

Thereafter, the processing returns to step S6 of FIG. 13.

In step S54, it is checked whether a human body is detected by the motion sensor 22, and if a human body is currently detected, the processing proceeds to step S57, and otherwise proceeds to step S55.

In step S57, the display timer T is subtracted (for example, T=T−1). Thereafter, the processing returns to step S25 of FIG. 14.

In step S55, as in step S27, the display area 131 corresponding to the re-execution key 121 and the display area 132 corresponding to the setting change key 122 are deleted from the display screen 102. Input operations with the re-execution key 121 and the setting change key 122 are set to be disabled, and the LEDs lit up are turned off.

In step S56, as in step S28, the display timer T is reset (T is set to 0). In this case, after the display of the display areas (131, 132), a user using the information processing apparatus may would be no longer present before a fixed time period elapses, and therefore, the setting contents of the current setting items are returned to the initial values.

Thereafter, the processing proceeds to step S53.

The flowchart according to the first embodiment was described above.

According to the above flowchart, if an input is entered with the re-execution key 121 or on the display area 131 corresponding to the re-execution key 121 while the display area 131 is displayed and while the re-execution key 121 is enabled, it is possible to easily and quickly re-execute the same function executed immediately before with the same setting contents.

If an input is entered with the setting change key 122 or on the display area 132 corresponding to the setting change key 122 while the display area 132 is displayed and while the setting change key 122 is enabled, it is possible to easily and quickly change the setting contents of the function executed immediately before.

Flowchart of Second Embodiment

Here, mainly, a process will be described in which after the scan function is executed immediately before, an input operation with the setting change key 122 is set to be enabled, the display area 132 corresponding to the setting change key 122 is displayed for a fixed time period, after the fixed time period elapses, the current setting is returned to the initial setting information, and if it is detected that the document placed on the document platen is changed to another document, the input operation with the setting change key 122 is set to be disabled, the display area 132 corresponding to the setting change key 122 is deleted, an input operation with the re-execution key 121 is set to be enabled, and the display area 131 corresponding to the re-execution key 121 is displayed for a fixed time period.

In the second embodiment, the processing from step S1 to step S11 illustrated in FIG. 13 is also executed in a similar manner, and therefore, an explanation thereof will be omitted.

Figure 16:
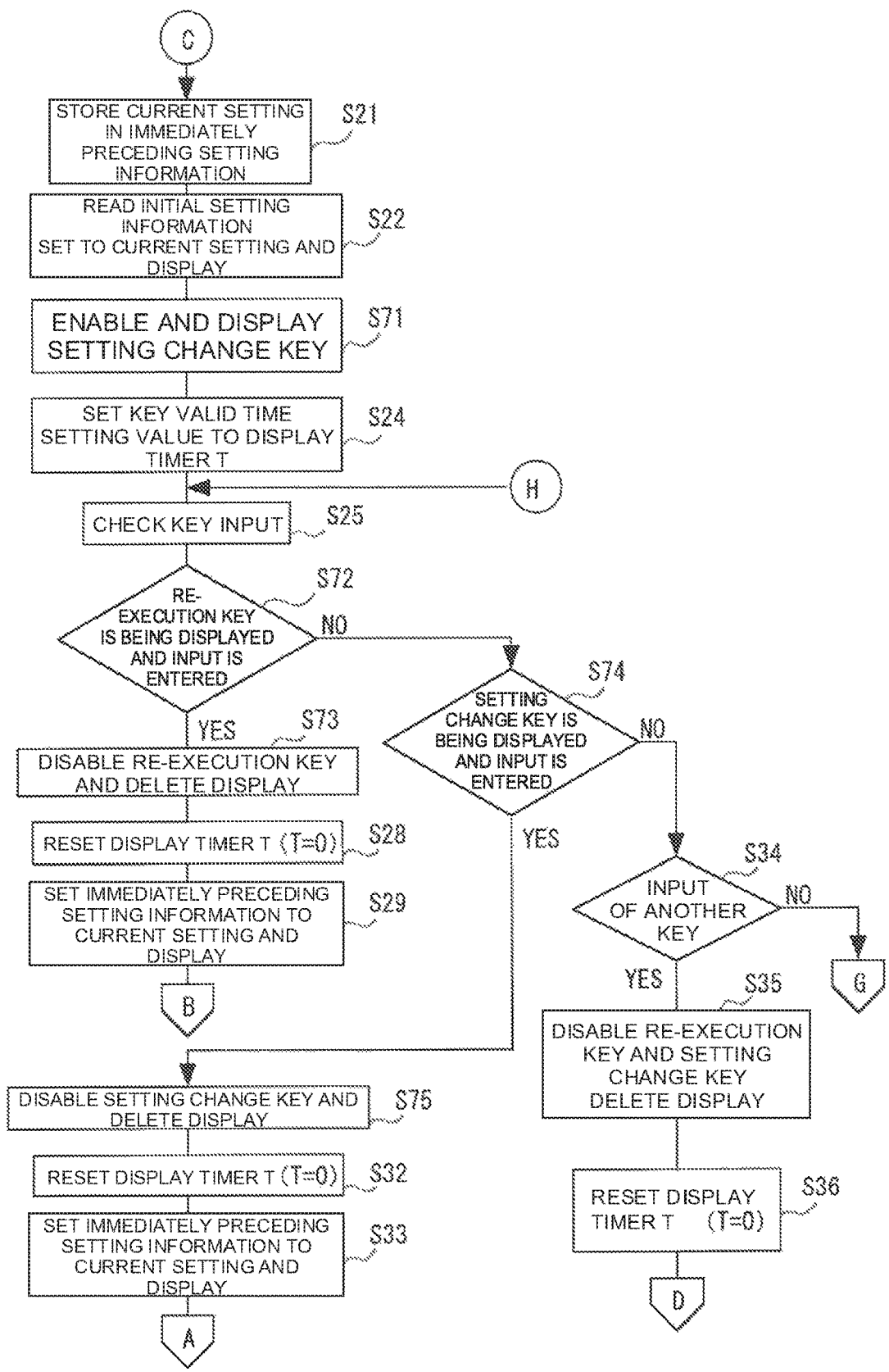
FIG. 16 is a flowchart, in continuation to FIG. 13, of another example of a control process performed when a scan process performed immediately before is re-executed in the present invention.

FIG. 16 illustrates a flowchart, in continuation to FIG. 13, of another example of a control process performed when a scan process performed immediately before is re-executed.

Figure 17:
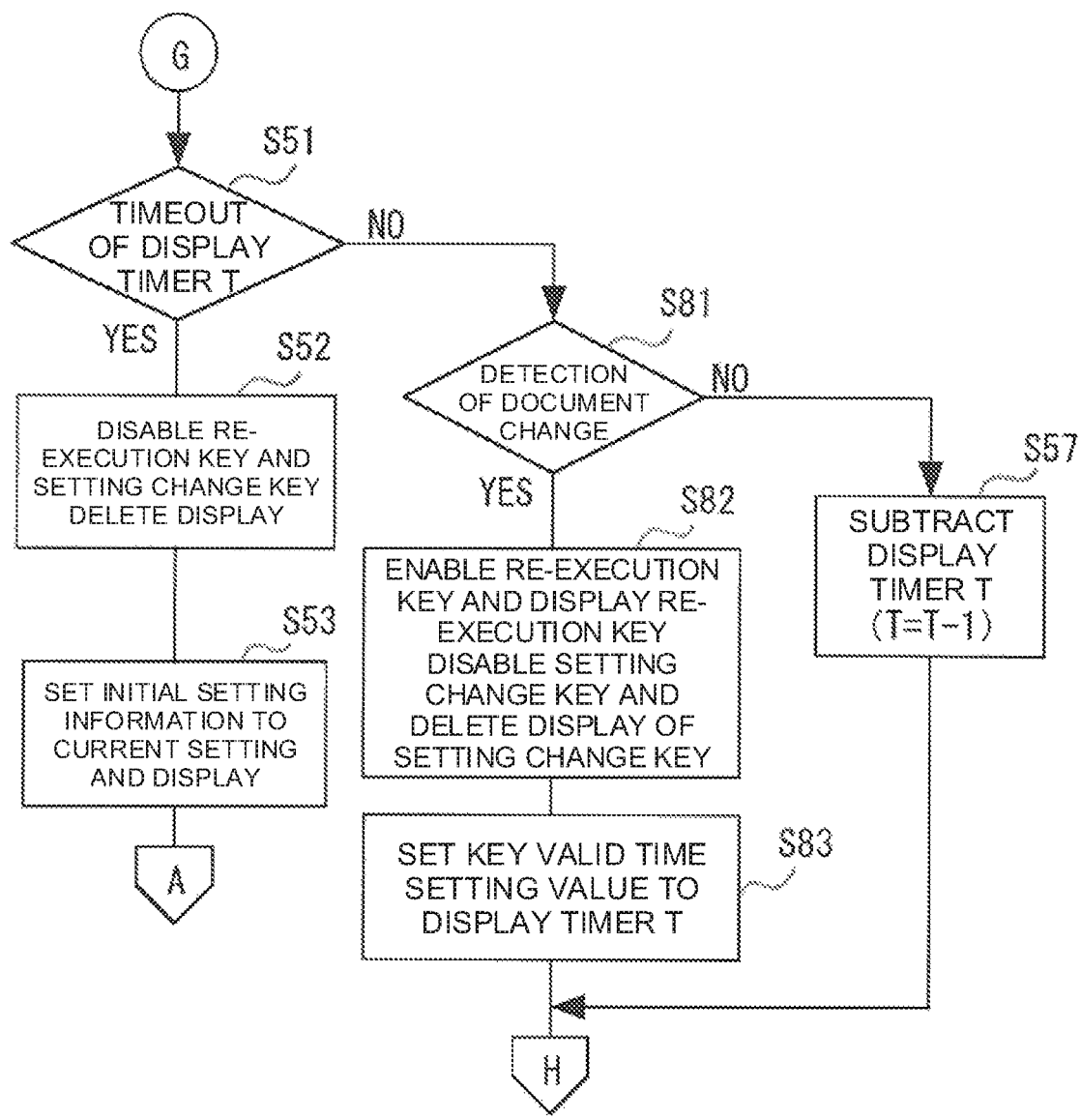
FIG. 17 is a flowchart, in continuation to FIG. 16, of an example of a control process performed when a scan process performed immediately before is re-executed in the present invention.

FIG. 17 illustrates a flowchart, in continuation to FIG. 16, of another example of a control process performed when a scan process performed immediately before is re-executed.

In the flowcharts, the same step numbers are assigned to steps of performing the same processing as the steps illustrated in FIGS. 13 to 15.

First, after step S11 in FIG. 13, the processing proceeds to step S21 in FIG. 16.

In step S21 of FIG. 16, as described in FIG. 14, the setting contents of the current setting are stored in the immediately preceding setting information 52.

In step S22, similarly to FIG. 14, the initial setting reader 25 reads the initial setting information 51 and sets the setting contents of the initial setting information 51 to the current setting.

Next, in step S71 of FIG. 16, the display area 132 corresponding to the setting change key 122 is displayed on the display screen 102.

Here, as illustrated in FIG. 10A, the display area 132 corresponding to the setting change key 122 is displayed.

An input operation with the setting change key 122 is set to be enabled, and if the LED (150 or 152) is provided, the LED is lit up.

In step S24, the key activation setter 24 sets a time period stored in the key enabled time setting value 53 to a display timer T, and activates the display timer T. As a result, a period during which the display area 132 is displayed, and a period during which the input operation with the setting change key 122 is enabled are set.

In step S25, the key input confirmer 23 checks whether an input operation with a predetermined key is performed.

In step S72, if the display area 131 corresponding to the re-execution key 121 is currently displayed, and an input is entered on the display area 131, the processing proceeds to step S73, and otherwise proceeds to step S74.

If an input operation with the re-execution key 121 is enabled, and an input is entered with the re-execution key 121 is input, the processing also proceeds to step S73.

In step S73, the display area 131 corresponding to the re-execution key 121 is deleted from the display screen 102. An input operation with the re-execution key 121 is set to be disabled, and the LED lit up corresponding to the re-execution key 121 is turned off.

In step S28, the display timer T is reset (T is set to 0).

In step S29, the immediately preceding setting reader 26 reads the immediately preceding setting information 52 and sets the setting contents of the immediately preceding setting information 52 to the current setting. The setting contents of the current setting are displayed on the display screen 102.

As a result, the setting contents of the current setting items are reset to the current setting during the execution of the scan function in the immediately preceding step S10, the setting contents stored in the immediately preceding setting information 52 are displayed, and preparations are made to enable the execution of the same function as that executed in the immediately preceding step S10 with the same setting contents.

Thereafter, the processing returns to step S10 of FIG. 13, and the same function is re-executed with the same setting contents.

In step S74, if the display area 132 corresponding to the setting change key 122 is currently displayed, and an input is entered on the display area 132, the processing proceeds to step S75, and otherwise proceeds to step S34.

If an input operation with the setting change key 122 is enabled, and an input is entered with the setting change key 122, the processing also proceeds to step S75.

In step S75, the display area 132 corresponding to the setting change key 122 is deleted from the display screen 102. An input operation with the setting change key 122 is set to be disabled, and the LED lit up corresponding to the setting change key 122 is turned off.

In step S32, the display timer T is reset (T is set to 0).

In step S33, the immediately preceding setting reader 26 reads the immediately preceding setting information 52 and sets the setting contents of the immediately preceding setting information 52 to the current setting. The setting contents of the current setting are displayed on the display screen 102.

As a result, the setting contents of the current setting items are reset to the current setting during the execution in the immediately preceding step S10, and preparations are made to enable a change in the setting contents stored in the immediately preceding setting information 52.

Thereafter, the processing returns to step S6 of FIG. 13, and the user changes the setting contents of the desired setting item.

If an input is entered with another key in step S34, the processing proceeds to step S35, and otherwise proceeds to step S51 of FIG. 17.

In step S35, if the display areas (131, 132) are displayed on the display screen 102, the display area 131 corresponding to the re-execution key 121 and the display area 132 corresponding to the setting change key 122 are deleted from the display screen 102.

Input operations with the re-execution key 121 and the setting change key 122 are set to be disabled, and the LED lit up is turned off.

In step S36, the display timer T is reset (T is set to 0).

Thereafter, the processing returns to step S7 of FIG. 13. Alternatively, the process associated with the other key with which an input is entered may be executed, and the processing may return to step S6.

In step S51 of FIG. 17, it is checked whether the display timer T times out (for example, if T=0), and if the display timer T times out, the processing proceeds to step S52, and otherwise proceeds to step S81.

In step S52, the display area 131 corresponding to the re-execution key 121 and the display area 132 corresponding to the setting change key 122 are deleted from the display screen 102.

Input operations with the re-execution key 121 and the setting change key 122 are set to be disabled, and the LED lit up is turned off.

In this case, after the display area 131 corresponding to the re-execution key 121 is displayed, no input operation is performed even after a fixed time period or longer elapses, and therefore, the setting contents of the current setting items are returned to the initial values.

In step S53, the initial setting reader 25 reads the initial setting information 51 and sets the setting contents of the initial setting information 51 to the current setting. The setting contents of the current setting are displayed on the display screen 102.

Thereafter, the processing returns to step S6 of FIG. 13.

In step S81, if the document detector 21 detects that the document is changed, the processing proceeds to step S82, and otherwise proceeds to step S57.

In step S57, the display timer T is subtracted (for example, T=T−1). Thereafter, the processing returns to step S25 of FIG. 16.

In step S82, the display area 131 corresponding to the re-execution key 121 is displayed on the display screen 102, and an input operation with the re-execution key 121 is set to be enabled.

The display area 132 corresponding to the setting change key 122 is deleted from the display screen 102, and an input operation with the setting change key 122 is set to be disabled.

If the LEDs (151, 152) are provided, the LED 151 corresponding to the re-execution key 121 is turned on and the LED 152 corresponding to the setting change key 122 is turned off.

In step S83, the key activation setter 24 sets a time period stored in the key enabled time setting value 53 to the display timer T, and activates the display timer T. As a result, a period during which the display area 131 is displayed, and a period during which an input operation with the re-execution key 121 is enabled are set.

Thereafter, the processing returns to step S25 of FIG. 16.

The flowchart according to the second embodiment was described above.

In the second embodiment, if an input is entered with the re-execution key 121 or on the display area 131 corresponding to the re-execution key 121 while the display area 131 is displayed and while the re-execution key 121 is enabled, it is also possible to easily and quickly re-execute the same function executed immediately before with the same setting contents.

If an input is entered with the setting change key 122 or on the display area 132 corresponding to the setting change key 122 while the display area 132 is displayed and while the setting change key 122 is enabled, it is possible to easily and quickly change the setting contents of the function executed immediately before.

Further, if the document is changed while the display area 132 corresponding to the setting change key 122 is displayed, it is considered that the same function is often executed with the same setting contents for another document, and therefore, the display is switched to the display in the display area 131 corresponding to the re-execution key 121, and the re-execution key 121 is enabled.

Thus, when the document is changed, if the display in the display area 132 corresponding to the setting change key 122 automatically switches to the display area 131 corresponding to the re-execution key 121, the load of the input operation on the user is reduced, and the user can easily enter an input on the display area 131 or with the re-execution key 121, and also easily and quickly re-execute the same function executed immediately before for another document with the same setting contents.

DESCRIPTION OF REFERENCE NUMERALS

1 Image forming apparatus (MFP),
11 Controller,
12 Operation device,
13 Display,
14 Image processor,
15 Image inputter,
16 Image former,
17 Image outputter,
21 Document detector,
22 Motion sensor,
23 Key input confirmer,
24 Key activation setter,
25 Initial setting reader,
26 Immediately preceding setting reader, 27 Setting item changer,
28 Function executer,
50 Storage,
51 Initial setting information,
52 Immediately preceding setting information,
53 Key enabled time setting value,
54 Human body detection information,
55 Document presence-or-absence information,
56 Selected function information,
57 Current setting information (current setting),
101 Operation panel,
102 Display screen,
103 Initial setting information display,
104 Immediately preceding setting information display,
110 Function selection key,
111 Scan key,
112 Copy key,
115 Function start key,
121 Re-execution key,
122 Setting change key,
131 Re-execution display area,
132 Setting change display area,
133 Re-execution in progress display area,
134 Scan and transmission reservation completed display area,
135 Scanning in progress display area,
150 LED,
151 LED 1,
152 LED 2

What is claimed is:

1. An information processing apparatus comprising:
an operation device that allows a predetermined input operation to be performed;
a key activation setter that sets whether to enable or disable the predetermined input operation;
a function executer that executes a function selected by the operation device; and
a storage that stores immediately preceding setting information containing setting values of setting items of a function executed immediately before, wherein
the operation device includes re-operation instruction keys that instruct an operation related to the function executed immediately before,
after the function selected is executed by the function executer, setting values of setting items used when the function selected is executed are stored as the immediately preceding setting information, and the key activation setter enables an input operation with a re-operation instruction key, for a fixed time period, and
if, within a time period during which the input operation with the re-operation instruction key is enabled, the input operation with the re-operation instruction key is performed, the function executer executes a process associated with the re-operation instruction key.

2. The information processing apparatus according to claim 1, wherein the re-operation instruction keys include:
a re-execution key for re-executing a function identical to the function executed immediately before; and
a setting change key for changing setting contents of setting items for executing the function selected.

3. The information processing apparatus according to claim 2, wherein after the function selected is executed by the function executer,
the key activation setter enables an input operation with the re-execution key out of the re-operation instruction keys, for a fixed time period, and
if, within a time period during which the input operation with the re-execution key is enabled, the input operation with the re-execution key is performed, the function executer re-executes the function identical to the function executed immediately before with contents identical to the setting values of the setting items contained in the immediately preceding setting information.

4. The information processing apparatus according to claim 2, wherein after the function selected is executed by the function executer,
the key activation setter enables an input operation with the setting change key out of the re-operation instruction keys, for a fixed time period, and
if, within a time period during which the input operation with the setting change key is enabled, the input operation with the setting change key is performed, the setting values of the setting items contained in the immediately preceding setting information are set to be changeable, and if the setting values of the setting items are changed through the operation device, the immediately preceding setting information is updated.

5. The information processing apparatus according to claim 2, wherein after the function selected is executed by the function executer,
the key activation setter enables an input operation with the re-execution key and an input operation with the setting change key, for a fixed time period,
if, within a time period during which the input operation with the re-execution key is enabled, the input operation with the re-execution key is performed, the function executer re-executes the function identical to the function executed immediately before with contents identical to the setting values of the setting items contained in the immediately preceding setting information, and
if, within a time period during which the input operation with the setting change key is enabled, the input operation with the setting change key is performed, the setting values of the setting items contained in the immediately preceding setting information are set to be changeable, and if the setting values of the setting items are changed through the operation device, the immediately preceding setting information is updated.

6. The information processing apparatus according to claim 3, wherein after the time period during which the input operation with the re-execution key is enabled elapses, the key activation setter disables the input operation with the re-execution key.

7. The information processing apparatus according to claim 5, wherein after the time period during which the input operation with the re-execution key is enabled elapses, the key activation setter disables the input operation with the re-execution key.

8. The information processing apparatus according to claim 4, wherein after the time period during which the input operation with the setting change key is enabled elapses, the key activation setter disables the input operation with the setting change key.

9. The information processing apparatus according to claim 5, wherein after the time period during which the input operation with the setting change key is enabled elapses, the key activation setter disables the input operation with the setting change key.

10. The information processing apparatus according to claim 1, wherein in the storage, initial setting information containing initial values of setting items is stored in advance, and current setting information containing current setting values of setting items for executing the function selected is stored, and if, within the time period during which the input operation with the re-operation instruction key is enabled, the input operation with the re-operation instruction key is not performed, after the time period during which the input operation with the re-operation instruction key is enabled elapses, setting change is effected to change the current setting information to the initial setting information.

11. The information processing apparatus according to claim 2, further comprising a display, wherein after the function selected is executed by the function executer, if the key activation setter enables an input operation with the re-execution key out of the re-operation instruction keys, for a fixed time period, a display area corresponding to the re-execution key is displayed on the display, and if, within a time period during which the input operation with the re-execution key is enabled, an input operation for selecting the display area corresponding to the re-execution key is performed, the function executer re-executes the function identical to the function executed immediately before with contents identical to the setting values of the setting items contained in the immediately preceding setting information.

12. The information processing apparatus according to claim 2, further comprising a display, wherein after the function selected is executed by the function executer, if the key activation setter enables an input operation with the setting change key out of the re-operation instruction keys, for a fixed time period, a display area corresponding to the setting change key is displayed on the display, and if, within a time period during which the input operation with the setting change key is enabled, an input operation for selecting the display area corresponding to the setting change key is performed, the setting values of the setting items contained in the immediately preceding setting information are made changeable, and if the setting values of the setting items are changed through the operation device, the immediately preceding setting information is updated.

13. The information processing apparatus according to claim 2, further comprising a motion sensor that detects a human body existing within a predetermined detection range, wherein if a state in which no human bodies are detected by the motion sensor continues for a fixed time period or longer, the key activation setter disables an input operation with the re-execution key and an input operation with the setting change key.

14. The information processing apparatus according to claim 2, further comprising a document detector that detects whether a document is placed on a document platen, wherein after the function selected is executed by the function executer, and then the key activation setter enables an input operation with the setting change key out of the re-operation instruction keys, for a fixed time period, if the document detector detects that the document is changed, an input operation with the re-execution key is enabled, and the input operation with the setting change key is disabled.

15. The information processing apparatus according to claim 2, further comprising display elements corresponding to the re-execution key and the setting change key, respectively, for checking whether input operations with the re-execution key and the setting change key are enabled or disabled, wherein if an input operation with either the re-execution key or the setting change key is set to be enabled, the display element corresponding to either the re-execution key or the setting change key is turned on or caused to flash on and off.

16. The information processing apparatus according to claim 1, wherein the function executer executes functions including a copy function of copying a document, a document reading function of reading and storing a document, and a document transmission function of reading and transmitting a document.

17. A method of controlling re-execution of an information processing apparatus, the information processing apparatus including: an operation device that allows a predetermined input operation to be performed; a key activation setter that sets whether to enable or disable the predetermined input operation; a function executer that executes a function selected by the operation device; and a storage that stores immediately preceding setting information including setting values of setting items of a function executed immediately before, the operation device including a re-execution key for re-executing a function identical to the function executed immediately before, and a setting change key for changing setting contents of setting items for executing the function selected, the method comprising:

selecting, through the operation device, a function to be executed;

after the function selected is executed by the function executer, storing setting values of setting items used when the function selected is executed, in the storage as the immediately preceding setting information, and enabling, with the key activation setter, an input operation with at least one or both of the re-execution key and the setting change key, for a fixed time period;

if, within a time period during which an input operation with the re-execution key is enabled, the input operation with the re-execution key is performed, re-executing a function identical to the function executed immediately before with contents identical to the setting values of the setting items contained in the immediately preceding setting information; and if, within a time period during which an input operation with the setting change key is enabled, the input operation with the setting change key is performed, setting the setting values of the setting items contained in the immediately preceding setting information to be changeable, and if the setting values of the setting items are changed through the operation device, updating the immediately preceding setting information.

* * * * *